United States Patent
Grassadonia et al.

(10) Patent No.: US 10,049,349 B1
(45) Date of Patent: Aug. 14, 2018

(54) PROCESSING ELECTRONIC PAYMENT TRANSACTIONS IN OFFLINE-MODE

(71) Applicant: Square, Inc., San Francisco, CA (US)

(72) Inventors: Brian Grassadonia, San Francisco, CA (US); Jesse Wilson, Waterloo (CA)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/869,576

(22) Filed: Sep. 29, 2015

(51) Int. Cl.
*G06Q 20/10* (2012.01)
*G06Q 20/32* (2012.01)
*G06Q 20/40* (2012.01)

(52) U.S. Cl.
CPC .......... *G06Q 20/10* (2013.01); *G06Q 20/327* (2013.01); *G06Q 20/4016* (2013.01)

(58) Field of Classification Search
CPC .................................................... G06Q 20/10
USPC .......................................................... 705/39
See application file for complete search history.

(56) References Cited

U.S. PATENT DOCUMENTS

| | | | |
|---|---|---|---|
| 7,089,208 B1 | 8/2006 | Levchin et al. | |
| 7,694,287 B2 | 4/2010 | Singh et al. | |
| 8,214,196 B2 | 7/2012 | Yamada et al. | |
| 8,504,423 B2 | 8/2013 | Rotbard et al. | |
| 8,762,272 B1 | 6/2014 | Cozens et al. | |
| 9,218,594 B2 | 12/2015 | Ramakrishna et al. | |
| 2007/0203836 A1 | 8/2007 | Dodin | |
| 2007/0208816 A1 | 9/2007 | Baldwin et al. | |
| 2009/0164374 A1 | 6/2009 | Shastry | |
| 2010/0211938 A1 | 8/2010 | Singh et al. | |
| 2012/0054102 A1 | 3/2012 | Schwartz et al. | |
| 2012/0158589 A1 | 6/2012 | Katzin et al. | |
| 2013/0262316 A1 | 10/2013 | Hruska | |
| 2014/0207679 A1 | 7/2014 | Cho | |
| 2014/0279447 A1 | 9/2014 | Dorsey et al. | |

(Continued)

FOREIGN PATENT DOCUMENTS

WO  2016/069958 A1   5/2016

OTHER PUBLICATIONS

Restriction Requirement dated Dec. 9, 2015, for U.S. Appl. No. 14/754,283, of Grassadonia, B. et al., filed Jun. 29, 2015.

(Continued)

*Primary Examiner* — Jessica Lemieux
(74) *Attorney, Agent, or Firm* — Lee & Hayes, PLLC

(57) ABSTRACT

In some examples, methods and systems may process one or more payment transactions between a merchant and a customer by establishing a short-range communication channel between a first computing device associated with a first user a second computing device associated with a second user. The method includes receiving, while the first computing device is offline with respect to a payment processing system, a fund transfer request from the second computing device, where the fund transfer request includes a payment proxy of the second user, the payment proxy having the syntax of a monetary currency indicator preceding an alphanumeric character. The method includes sending the fund transfer request from the first computing device to payment processing system after the first computing device establishes network connectivity with the payment processing system using a long range communication network protocol. The payment processing system processes the request unless the request has been previously authorized.

30 Claims, 10 Drawing Sheets

(56) References Cited

U.S. PATENT DOCUMENTS

| | | | |
|---|---|---|---|
| 2014/0372300 A1* | 12/2014 | Blythe | G06Q 20/3676 705/41 |
| 2015/0006386 A1* | 1/2015 | Tebbe | G06Q 20/3274 705/44 |
| 2016/0005024 A1* | 1/2016 | Harrell | G06Q 20/12 705/39 |
| 2016/0012430 A1* | 1/2016 | Chandrasekaran | G06Q 20/385 705/44 |
| 2016/0125368 A1 | 5/2016 | Grassadonia et al. | |
| 2016/0125369 A1 | 5/2016 | Grassadonia et al. | |
| 2016/0125370 A1 | 5/2016 | Grassadonia et al. | |
| 2016/0125371 A1 | 5/2016 | Grassadonia et al. | |
| 2017/0011383 A1 | 1/2017 | Melzer | |

OTHER PUBLICATIONS

Non-Final Office Action dated Feb. 2, 2016, for U.S. Appl. No. 14/754,223, of Grassadonia, B., et al., filed Jun. 29, 2015.

Non-Final Office Action dated May 10, 2016, for U.S. Appl. No. 14/754,283, of Grassadonia, B. et al., filed Jun. 29, 2015.

International Search Report and Written Opinion for PCT Application No. PCT/US2015/058168, dated Apr. 12, 2016.

Final Office Action dated Aug. 12, 2016, for U.S. Appl. No. 14/754,223, of Grassadonia, B., et al., filed Jun. 29, 2015.

Final Office Action dated Dec. 8, 2016, for U.S. Appl. No. 14/754,283, of Grassadonia, B., et al., filed Jun. 29, 2015.

Advisory Action dated Dec. 15, 2016, for U.S. Appl. No. 14/754,223, of Grassadonia, B., et al., filed Jun. 29, 2015.

Non-Final Office Action dated Jun. 16, 2017, for U.S. Appl. No. 14/754,362, of Grassadonia, B., et al., filed Jun. 29, 2015.

* cited by examiner

| User1 ID1 | User 1 ID2 | User 1 ID3 | First Name | Last Name | Billing Address |
|---|---|---|---|---|---|
| $aaron | aaron@gmail.com | Low Risk | Aaron | Doe | 654 ABC St., New York, NY 10086 |
| $calistatepark | statepark@gmail.com | Low Risk | Cali | State Park | 100 PQ st, Seattle, WA 98101 |
| $Joe | -- | Medium Risk | Joe | Doe | 30 Fly St., New York, NY 10086 |
| $funnyguy311 | funnyBernie@gmail.com | High Risk | John | Smith | 123 Sesame St., Palo Alto, CA 94304 |
| $redcross | redcross@gmail.com | Low Risk | The | Redcross | 123 Easy St., Mountain View, CA 94041 |

704

| User 1 ID1 | Card Number/Account Number | Issuer | Expiration | Billing Address |
|---|---|---|---|---|
| $aaron | XXXXXXXXXX | Bank of America | 1/31/2016 | 123 Sesame St., Palo Alto, CA 94304 |
| $calistatepark | XXXX-XXXX-XXXX-XXXX | Wells Fargo | 5/31/2017 | 100 PQ st, Seattle, WA 98101 |
| $redcross | XXXXXXXXXX | Chase | 6/1/2015 | 654 ABC St., New York, NY 10086 |
| $Joe | -- | -- | -- | 30 Fly St., New York, NY 10086 |
| $funnyguy311 | XXXX-XXXX-XXXX-XXXX | Bankfree | 1/31/2016 | 123 Easy St., Mountain View, CA 94041 |

706

| Nature of Transaction | Transaction Date | Transaction ID | User1 ID1 | User2 ID1 | Amount |
|---|---|---|---|---|---|
| ID1 Online | 050515 | 22351 | $redcross | $aaron | $25 |
| ID1 Offline | 050615 | 25684 | $alex | $Joe | $15 |
| ID1 Offline | 050715 | 25685 | $funnyguy311 | $alex | $5 |
| ID2 Online | 050815 | 25686 | $aaron | $calistatepark | $10 |
| ID2 Offline | 050915 | 25114 | $Joe | $aaron | $100 |

PROCESSING ELECTRONIC PAYMENT TRANSACTIONS IN OFFLINE-MODE

TECHNICAL FIELD

Card readers are available to process electronic payment transactions between devices associated with a merchant and a customer. Conventionally, both the devices are required to be online to be able to send payment information to remote authorization servers, which then confirm the payment information. However, in some situations, one of the devices may be in an area where the Internet connection is either unavailable or inconsistent.

For example, consider a scenario in which a cab driver, who receives payment through a card reader connected to his mobile phone, drops a passenger in an area where cellular data network is unavailable. In such scenarios, the cab driver has to find an alternate way to charge the passenger for a cab ride, thus rendering the card reader useless. Alternatively, the cab driver may bear the risk of the credit card being declined due to inconsistent Internet connection, given that the driver would likely learn that the card has been declined when the passenger has long left the cab.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

FIG. 7 illustrates example database tables in accordance with some embodiments of the present subject matter.

DETAILED DESCRIPTION

Figure 1:
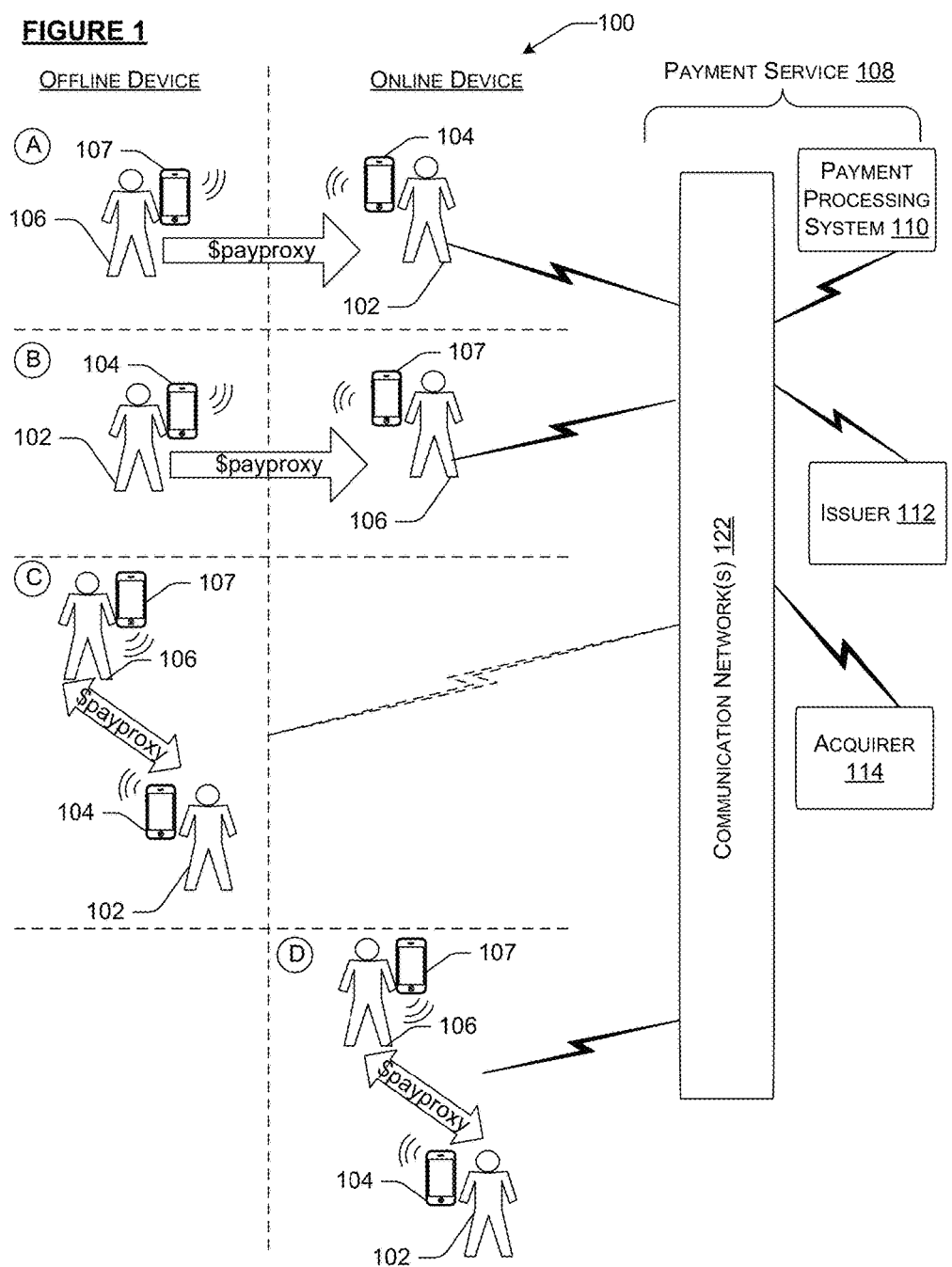
FIG. 1 is a network diagram illustrating processing of payment transactions between a customer and a merchant in various offline-online scenarios, according to an embodiment of the present subject matter.

Some implementations described herein include techniques and arrangements for capturing and processing payments in an offline-mode, i.e., while at least one of the customer device and a merchant device are offline with respect to a payment processor. Generally, a payment transaction involves a customer providing a payment card, such as a credit card or debit card, to pay for a product or service that the customer receives from a merchant. The credit card is swiped or dipped in a card reader, which is connected to or included within a point-of-sale (POS) terminal. The swiping action and data collected thereof leads to generation of a payment request. The POS terminal electronically sends the payment request over an available network connection to a payment card processor for authorization. The payment card processor, with or without analyzing the request, routes the request to a card network, e.g., Visa® or MasterCard®, which in turn sends the request to the card issuer, e.g., a bank, for approval. Usually, after a short delay, the POS terminal may receive an indication of whether the payment card has been approved (i.e., authorized) or declined (i.e., failed to authorize) for an amount of the transaction, such as a cost of the good or service. Assuming the card issuer approves the transaction, the payment card processor causes funds to be transferred from the customer's bank account to a merchant's bank account, and optionally creates a receipt indicating successful processing of a payment transaction, which is sent to a customer device.

In the aforementioned methodology, both the recipient device and the sender device have to stay in the "online mode" until the transaction is processed and deemed complete. But, "authorization delay," associated with transactions in online mode, can increase based on various factors, such as an increase in network latency or a slowdown in the authorization process at a payment card processor. These delays may be unacceptable during peak working hours at the merchant location (e.g., when the merchant has a long line and wishes to avoid customers from having a negative experience due to a long wait). Accordingly, the merchant may at times operate the POS terminal in an offline-mode instead of operating the POS terminal in the online-mode.

Some conventional technologies have provided ways to perform transactions in offline-mode. When the POS terminal operates in the offline-mode, the POS terminal locally stores the payment card and transaction summary. The POS terminal then batches all the offline transactions and sends them to the payment card processor after the POS terminal has transitioned into the online-mode. But, in some instances, it is possible that the POS terminal does not transition back into the online-mode for many minutes or even hours. For example, if the merchant is stationed somewhere where the POS terminal lacks network connectivity, the POS terminal will not transition into the online-mode until the POS terminal moves to a location having network connectivity. As such, the merchant who accepts the credit card in the offline-mode will likely not learn of the payment transaction being unauthorized until after the customer has left merchant's location. Also, network problems, such as network unavailability or network latency, manual or automatic transition between the offline and online-modes based on factors other than network connectivity or even power-saving requirements dictated by an application, device or a user, can interfere with the proper routing of the payment request to the payment card processor, card issuer, or card network. Thus, in cases where instant or near-instant fulfillment of transactions is desired, it may be difficult to receive authorization as the intended recipient may or may not have Internet availability at the time of the transaction. As a result, the merchant may bear the risk of not receiving payment for the provided item or service corresponding to offline transactions.

To avoid such risks, technology is disclosed herein for transfer of funds (e.g., money) between a sender (e.g., a customer) and a recipient (e.g., a merchant) by transfer and use of a "payment proxy," particularly in cases where the customer device (such as a mobile phone or a portable computer) or the merchant device (e.g., a POS terminal or a payment beacon) is offline ("the offline payment technology") with respect to a payment processing system that processes the transfer of funds. "Online" refers to Internet based communications, whereas the term "offline" refers to non-internet, short-range communication distance (less than about 100 meters) based communications, e.g., BLE or Bluetooth communications. Due to availability of a short-range communication network in offline scenarios, the customer and the merchant devices pair with each other and can exchange payment proxy particularly in cases where long-range networks are not available. The first device that comes online then completes the transaction using exchanged payment proxy on behalf of the offline device. In another scenario, both devices submit payment requests on behalf of the other to the payment processing system as and when the devices transition into the online mode. The payment processing system then processes the transaction based on, for example, the chronological order of the payment requests. In case where the requests are received contemporaneously, the payment processing system can resolve contention based on stored knowledge base or rules.

As used here, the term "payment proxy" refers to a payment identifier, e.g., name, driver's license number, email address, phone number, or in general any identifier associated with or representative of the financial or bank account of the merchant/customer or sender/recipient. In one example, the payment proxy can include an alphanumeric character (or a string of alphanumeric characters) and a monetary indicator (e.g., "$", etc.) preceding the alphanumeric character. The term "alphanumeric character" as used here refers to a symbol that can be a number (i.e., numeric), a letter (i.e., alphabetic), or a combination thereof. When used, the payment proxy by and of itself is capable of initiating payment transactions without the customer having to submit credit card, debit card, actual bank account information, or the like. The payment proxy can be used in web applications, messaging applications, social networking platforms, forums, and the like. In one implementation, the users create and register a payment proxy of their interest in the payment processing system, or even in their devices. The users also associate their financial account information (e.g., credit card number, bank account number, etc.) to the payment proxy at the time of registration. Mobile payment applications stored and/or accessed via mobile devices can be used to make such registrations.

Briefly described, a customer using a customer device identifies another proximate device associated with the merchant or recipient (hereinafter referred to as merchant device), e.g., a card reader, a card reader connected to a POS terminal, a POS terminal, or a payment beacon, any of which is a counterparty in a payment transaction. The customer device and/or the merchant device is in offline with respect to a payment processing system. The customer device and the merchant device establish a communication channel using wireless technologies, e.g., Bluetooth, Bluetooth Low Energy (BLE), Wi-Fi, Radio Frequency Identification (RFID), Quick-Response (QR) codes, Near-Frequency Communication (NFC), etc. Thus, an Internet connection is not necessary to establish a short-range communication field or channel.

Through the established channel or communication field, the merchant device transmits payment proxy, which is indicative of the financial or bank account of the merchant/recipient. The merchant device may either persistently, on activation or identification by an external device, e.g., in response to a visual, audio or tactile input by a user of the customer device or merchant device, relay payment related information like the payment proxy of the merchant, regardless of whether a reliable Internet connection is available. The customer device, too, is configured to receive/send the payment proxy through the established communication channel to neighboring devices.

Since either of the customer device or the merchant device (or a card reader connected thereto), can transmit and/or receive payment proxies, one of the entities can be the initiator or "primary device" of a payment transaction, while the other entity can be the respondent or "secondary device" of the payment transaction. As used here, the "primary device" is a device that receives the payment proxy, which then, on behalf of the other entity, generates a payment request, and submits the request along with the to the payment processing system for authorization and fulfillment of a payment transaction. The "secondary device" is, therefore, the device that sends the payment proxy to the primary device for generation of the payment request.

In some cases, the primary-secondary relationship can be fixed and/or set based on user preferences. For example, the merchant device is always the primary device and the customer device is always the secondary device. In other cases, the primary-secondary relationship is determined based on which device is online or comes online first. For example, if the customer device transitions from an offline mode to online mode before the merchant device, the customer device becomes the primary device and initiates fulfillment of payment transaction, and the offline merchant device stays as a secondary device. In another case, both devices are primary devices that initiate payment transactions and submit payment request corresponding to the payment transaction as and when the devices establish network connectivity with the payment processing system. The payment processing system is then responsible for either choosing one request while discarding other, or processing both the requests, by transferring funds in response to the first request and transferring 'null' funds in response to the second request. Depending on which device between the customer device and the merchant device is online, the treatment to processing of transactions may differ.

To this end, the following scenarios are now considered. In the first scenario, the customer device is offline, but the merchant device is online; in the second scenario, the customer device is online, but the merchant device is offline; in the third scenario, both the customer device and the merchant device are offline; and finally, in the fourth scenario, the customer device and the merchant device are online. The offline payment technology, described herein, involves communication between a payment processing system that is authorized to process the payment transaction based on a payment request received from at least one of the merchant or the customer device that is online with respect to the payment processing system.

When the customer device is offline and the merchant device is online, the merchant device serves as a primary device and obtains the payment proxy from the customer through a localized connection set up through, for example, Bluetooth or BLE. The merchant can then enter the received payment proxy into a dedicated field on a portal, e.g., a web application, an email application, a messaging application, a cloud application, a forum, a shopping form, a landing page associated with a uniform resource locator (URL) address, and/or like, which may be stored on or accessible via the merchant device, to create a request in response to a payment transaction for an item purchased by the customer from the merchant. Alternatively, the merchant device can automatically, on receipt of the payment proxy, generate a payment request. Through the portal, the merchant can also specify a predefined amount that the sender owes to the merchant. The merchant device, that is online, sends the request to a payment processing system, and optionally, sends a notification to the offline customer device (e.g., through a short-range communication channel) indicating that the payment request has been submitted. In one implementation, the payment processing system can optionally parse the payment proxies of the sender and/or recipient and apply a syntax matching algorithm. The payment processing system can then communicate with a financial institution (e.g., an issuer or an acquirer) to determine details of the financial account associated with the payment proxy and process the transaction on receiving confirmation from the financial institution. In some embodiments, a merchant server can maintain a database including the information of financial accounts.

When the customer device is online and the merchant device is offline, the customer device serves as a primary device and obtains the payment proxy from the merchant through a short-range, localized connection set up through, for example, Bluetooth or BLE. The customer can then enter the received payment proxy into a dedicated field on a portal, e.g., a web application, an email application, a messaging application, a cloud application, a forum, a shopping form, a landing page, and/or like, which may be stored on or accessible via the customer device, to create a request in response to a payment transaction for an item purchased by the customer from the merchant. Alternatively, the customer device can automatically, on receipt of the payment proxy, generate a payment request. Through the portal, the customer can also specify an intention to transfer a predefined amount to a recipient. The customer device that is online sends the request to a payment processing system, and optionally, sends a notification to the offline customer device (e.g., through a short-range communication channel) indicating that the payment request has been submitted. In one implementation, the payment processing system can optionally parse the payment proxies of the sender and/or recipient and apply a syntax matching algorithm. The payment processing system can then communicate with a financial institution (e.g., an issuer or an acquirer) to determine details of the financial account associated with the payment proxy and process the transaction on receiving confirmation from the financial institution. In some embodiments, a merchant server can maintain a database including the information of financial accounts.

When both the customer device and the merchant device are offline, one or both the devices can serve as primary devices. Either of the devices can receive or transmit payment proxy to the other device in response to a payment transaction for an item purchased by the customer from the merchant. When either the customer device or the merchant device comes online, the primary device sends the payment request having the payment proxy to the payment processing system, and optionally, sends a notification to the other device (e.g., through a short-range communication channel) indicating that the payment request has been submitted. The payment processing system can then communicate with a financial institution (e.g., an issuer or an acquirer) to determine details of the financial account associated with the payment proxy and process the transaction on receiving confirmation from the financial institution. In some embodiments, a merchant server can maintain a database including the information of financial accounts. In some cases, both the devices may come online contemporaneously; in such cases, a contention component decides which device should submit the payment request. The contention component resolves the contention based on factors, such as risk scores associated with the devices, the signal strength, and the like. In some cases, the contention resolution may be fixed such that the payment processing system receives requests from all devices but waits for a specific device (e.g., the merchant device) to transition into the online mode and submit the payment request regardless of the timing of transition.

In another case, the first device sends a notification to the second device when it transitions into the online mode and submits the payment request, thus the second device may choose not to submit the payment request. In yet another case, the payment processing system resolves the contention between two devices submitting the payment requests. Thus, both the devices submit the payment request on behalf of the other independent of when the other device transitions into the online mode. The payment processing system processes the request based on factors, such as the order in which it receives the request, the risk score associated with either of the devices, any preferences in the database set by the merchant or the customer, time of the day, payment amount, etc. The payment processing system discards the other request as duplicate and sends a notification to the other device indicating that the first request is being processed.

When both the customer device and the merchant device are online, one or both the devices can contemporaneously generate a request with payment proxies of the customer and/or merchant and send to the payment processing system, where the request corresponds to a payment transaction for an item purchased by the customer from the merchant. The payment processing system can then communicate with a financial institution (e.g., an issuer or an acquirer) to determine details of the financial account associated with the payment proxies and process the transaction on receiving confirmation from the financial institution. In case of duplicate request, the payment processing system can choose to respond to one of the requests while discarding the other. In some embodiments, a merchant server can maintain a database including the information of financial accounts.

Some implementations described herein also include techniques and arrangements for providing security and risk-rating features to customers who utilize mobile devices to conduct transactions in an offline mode, the security features protecting the merchant from fraudulent transactions. In some embodiments, the primary device (the merchant device or the customer device as the case may be) is associated with a risk analysis component. The risk analysis component can be stored locally onto the customer device (or the merchant device) to determine the likelihood of risk associated with the payment transaction. The risk analysis component determines risk based on past transaction history, e.g., history of transactions between the customer and that particular merchant, if any, a risk rating associated with the merchant pushed onto the customer device along with the payment proxy (that indicates the transaction "health" of the merchant), and the like. Accordingly, the risk evaluation component determines whether the communicating device can be trusted, and if it can be trusted, in some cases, provisionally or conditionally authorizing a payment transaction, e.g., even in the offline mode. Such provisional transactions are confirmed when either of the device transitions into the online-mode. Further, in the embodiments described herein, several transactions can be batched and processed when either of the customer device or the merchant device transitions into the online mode.

The embodiments of the methods and systems described allow merchants or customers to conduct electronic payment transactions even if the computing devices associated with the merchant and/or the customer do not have an Internet connection to immediately process the payment transaction. In particular, this allows the merchant to conduct more business with customers without worrying about maintaining a constant network connection with a payment processing system. The risk analysis component ensures that the number of fraudulent transactions associated with the payment proxy can be reduced based on previous transactions or health metadata, which in turn indicates a level of risk associated with the payment object. In spite of the offline nature of the payment transactions, the entire transaction experience is seamless and convenient, particularly in scenarios where a payment object reader is mobile. Although various examples in this disclosure involve payment-capture techniques being utilized in the "offline-to-online" contexts described above, it should be understood that the payment-capture techniques are not limited to such contexts. Furthermore, such embodiments are configured to operate with a variety of mobile devices, web applications, mobile applications, POS topologies, payment cards, computer networks, and environments.

Throughout this disclosure, reference is made to devices operating in either an online mode or an offline mode. Whether a device is considered to be in an offline mode or an online mode may vary depending on the implementation. In some examples, offline mode refers to a mode in which a device is unable to connect to or communicate with at least one other device (e.g. offline with respect to the other device with which the device is not connected or able to communicate). In some examples, the offline mode may be total or selective. Some examples of a device in an offline mode are a device which is out of range of a radio base station, a device that is unplugged from a hardline network, a device that has been intentionally put into an offline or "airplane" mode, a device that is part of an ad-hoc network that is experiencing a temporary network partition through a connectivity issue of another device in the ad-hoc network. In some embodiments, a device is said to be operating in an offline-mode when it is able to communicate with a device in its neighborhood through a short range or peer-to-peer network (typically less than 100 meters) and/or low power wireless communication network, such as Bluetooth Low Energy (BLE), standard Bluetooth, Wi-Fi, Near Field Communication (NFC) or Radio-Frequency Identification (RFID), but is unable to connect to a long range network, and so on.

In some examples, a device is in an online mode when it is able to communicate or connect with at least one other device or server through a long range network. Similarly to an offline mode, the online mode may be total or selective. Some examples of a device being in an online mode include a device that can communicate with another device through a public network, such as the Internet or a private network, such as Local Area Network (LAN), Wide Area Network (WAN), Metropolitan Area Network (MAN), Storage Area Network (SAN), System Area Network (SAN), Server Area Network (SAN), Small Area Network (SAN), Personal Area Network (PAN), Desk Area Network (DAN), Controller Area Network (CAN), Cluster Area Network (CAN), Cloud-Based Network or combinations thereof, a device that can communicate with all devices in the public or private network, and/or a device that can communicate with a payment processing system, and so on.

In some cases, the device operates in both online and offline modes. For example, an offline device establishes a short-range communication channel with another offline device, and continues to do so even after both the devices transition into the online mode. The devices, however, always need a long range communication channel to connect with remote devices, e.g., payment processor. In some cases, the payment processor is in proximity to the devices and can therefore connect with either of the devices through a short range communication channel.

As used herein, a merchant may include any business engaged in the offering of goods or services for acquisition by customers. Actions attributed to a merchant may include actions performed by owners, employees, or other agents of the merchant and thus no distinction is made herein unless specifically discussed. In addition, as used herein, a customer may include any entity that acquires goods or services from a merchant, such as by purchasing, renting, leasing, borrowing, licensing, or the like. Hereinafter, goods and/or services offered by merchants may be referred to as items. Thus, a merchant and a customer may interact with each other to conduct a transaction in which the customer acquires an item from a merchant, and in return, the customer provides payment to the merchant.

As used herein, a "payment transaction" or simply "transaction" may include a financial transaction for the acquisition of goods and/or services that is conducted between a customer and a merchant. For example, when paying for a transaction, the customer can provide the amount that is due to the merchant using a payment proxy. In other cases, the payment transaction includes transfer of money from one party to another for any number of reasons. Thus, while the description refers to as customer and merchant as parties to the payment transaction, it will be understood that the parties can be a sender-a recipient, a land lord-renter, a bank-bank customer, a first friend and a second friend, and so on.

The term "payment card" or "payment object" refers to a payment mechanism that includes a conventional debit card, a conventional credit card, a prepaid gift card, or the like, a smartcard that has an embedded integrate circuit chip (e.g., Europay-MasterCard-visa (EMV) card), a replacement card, or any card that functions as a combination of any of these mechanisms. The term "replacement card" as used herein refers to a card that may or may not bear a card number/account number that appears to be that of a real credit or debit card account (i.e., it is in the correct format), but where that card/account number is actually only a proxy for the customer's real card/account number. Additionally, the payment card used in the example above is a specific type of a financial instrument. Other types of financial instruments, other than the payment card, can be used to initiate the transfer of funds. An example of another type of a financial instrument is a biometrically identifiable instrument initialized by a biometric characteristic, such as a person's finger (e.g., for fingerprint recognition), face, iris or retina, heartbeat, voice, etc. Alternatively, a financial instrument can be a software instrument or virtual instrument, such as a virtual wallet. Other examples of payment card may also include a prepaid card, a gift card, a rewards card, a loyalty points card, a frequent flyer miles card, a check, cash, or any other kind of payment instrument that holds financial value or provides a promise to pay at a later time. Payment card may also include a payment object, such as an electronic device configured to initiate contactless payment transactions, e.g., a key fob, a mobile device (such as a mobile device having an NFC tag).

As disclosed herein, a payment proxy can be used towards payment transactions, where the payment proxy has the syntax of a monetary indicator prefixing an alphanumeric indicator (e.g., $Joe or $joe123). The users (customer or merchant) register the payment proxy with the payment processor in the online mode, where registering requires the merchant to associate the payment proxy to a financial account of the user. The payment proxy can also be stored locally onto the user device. The payment proxy can be used on a variety of portals, such as landing pages, forums, messaging applications, mobile payment applications, and so on.

In one implementation, the payment object, the merchant device and the customer device support the same technology for short-range (typically less than 100 meters) and/or low power wireless communication, such as Bluetooth Low Energy (BLE), standard Bluetooth, Wi-Fi, Near Field Communication (NFC) or Radio-Frequency Identification (RFID).

The term "landing page," as used here, refers to a virtual location identified by a personalized location address that is dedicated to collect payments on behalf of a recipient associated with the personalized location address. The personalized location address can include the payment proxy discussed above. In some embodiments, the landing page is identified by a uniform resource locator (URL) that includes a payment proxy, where the URL is accessible through a web browser application installed on a client device of the sender. For example, the URL is www....com/$charityName. In another example, the URL is www....com/$aaron. In some embodiments, the landing page is identified by a graphical user interface (GUI) of a mobile payment application installed on a client device of the sender. For example, the GUI of the mobile payment application is dedicated to $charityName, where there can be multiple GUIs each dedicated to a different payment proxy.

The landing page is generated by the payment processing system to receive, e.g., collect, one or more payments on behalf of the recipient from one or more senders. The sender can access the landing page, e.g., by entering a URL into a web browsing application installed on the sender's client device. Upon navigating to the URL, the sender can simply enter a payment amount, e.g., in a web form field, and send the money, e.g., by selecting a "Pay" action button displayed on the website. In another example, the sender can access the landing page, e.g., by selecting a GUI within a mobile payment service application, where the GUI, e.g., is labeled with the payment proxy $aaron. The sender can further enter a payment amount at the GUI and send the money, e.g., by selecting a "Pay" action button displayed on the GUI.

The term "forum," as used here, refers to a media channel (e.g., a social networking website, a microblog, a blog, etc.) that enables user interaction and engagement through comments, posts, and/or messages. The forum can be employed by a service provider to provide various services to users of the forum, e.g., create messages, post comments, interact with one another, etc. Within a forum context, a user can indicate an intent to transfer money by specifying a payment proxy in a message that the user submits, e.g., "posts," on a particular forum, where that payment proxy carries the syntax of the monetary indicator preceding one or more alphanumeric characters. For example, the user posts a message "I support $funnyguy311 with $10." In such an example, the payment processing system detects the user's intent to send money, e.g., $10, to "$funnyguy311" and initiates the transfer of money upon identification of a recipient financial account associated with "$funnyguy311." The monetary indicator can correspond to various currencies, e.g., dollar ($), euro (€), pound (£), rupee (■), yuan (¥), etc. Although use of the dollar monetary indicator ($) is used herein, it is to be understood that any currency symbol could equally be used.

The term "messaging application," as used here, refers to any messaging application that enables communication between users (e.g., sender and recipient of a message) over a wired or wireless communications network. The messaging application can be employed by a service provider that delivers a communication service to users, e.g., chat capability. The messaging application can include, for example, a text messaging application for communication between phones (e.g., conventional mobile telephones or smartphones), or a cross-platform instant messaging application for smartphones and phones that use the Internet for communication. Within a messaging application context, a user can indicate an intent to transfer money by specifying a payment proxy in a TO field of, e.g., a message, that the user inputs within the messaging application. For example, the user enters into the TO field "$redcross." In another example, the user enters into the TO field "$aaron." Once the user enters a payment proxy, or input, into the TO field, the user can enter a message in a body of the message, e.g., "Here is $10," and send the message. In various embodiments, the message can be a text message, a chat message, an email message, or indeed any other type of message that is capable of being exchanged between computing devices. Although this specification may employ text messages as an example, it is to be understood that the payment proxy technology may employ any of these types of messages. Upon receiving an indication to send (e.g., after detecting that the user has clicked "Send"), the messaging application transmits a message, e.g., the text message to a messaging application computer system ("messaging application system"). The messaging application system detects that the input in the TO field of the message it has received includes a syntax of a monetary indicator preceding one or more alphanumeric characters. In response, the messaging application system forwards the text message to the payment processing system for processing. The payment processing system identifies a recipient associated with the input (or payment proxy) that is derived from the TO field, and further identifies a recipient financial account associated with that recipient. Upon identification of the recipient financial account, the payment processing system initiates the transfer of money.

The term "mobile payment application" includes e-commerce applications that are associated with one or more merchants and can be used by the customer to purchase products or services. The mobile payment application can also be websites, forums, URLs, application program interfaces (APIs), or any source website or application that either hosts a description of the product or service and/or provides an option to buy the product or service, irrespective of whether it is directly connected to the merchant. The mobile payment application can also be a website or application that provides a portal to send and accept payments for transactions, and does not necessarily host the items for customer's purchase. The mobile payment application in this works with the merchant's e-commerce application.

It is noted that the payment proxy technology is equally applicable in other embodiments to various other content providers and various other types of providers, such as financial service providers or to any application that involves communication of messages between users, and that the payment proxy technology is not limited to media channels and/or messaging applications.

The preceding summary is provided for the purposes of summarizing some exemplary embodiments to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

Turning now to the Figures, FIG. 1 is a network diagram 100 illustrating interaction between a payment service, and a merchant device or a customer device, either or both of which are operating in offline mode, for processing an offline payment transaction, according to an embodiment of the present subject matter. The environment 100 includes a merchant 102 operating a mobile point-of-sale (POS) terminal 104, a desktop computer, a hand-held device, a network computer, a laptop, tablet or other portable computer, a mobile phone, a landline phone, or any other form of processing device (with an in-built or a card reader associated thereto) interacting with customers 106 (also referred to as "user" or "consumer") connected to their respective customer devices 107 (e.g., mobile computers or phones).

In one implementation, the POS terminal 104 can accept one or more payment objects presented by a customer 107 towards a payment transaction for a product and service ("item"). The transaction is processed and fulfilled via the POS terminal 104, the payment processing system 110, and the financial network systems 112 and 114, together referred to as payment service 108, coupled communicatively through the communication network 115. The network 115, in one implementation, is a wide area network, such as the Internet, and may include a wireless network, such as a cellular network, a cloud network, a local wireless network, such as Wi-Fi.

As described herein, the merchant 102 can engage in various payment transactions with the customer 106 irrespective of whether the customer device 107 and/or the POS terminal 104 is in an online mode or offline mode.

To elaborate the implementation of offline payment technology, four example scenarios are discussed hereinafter: in scenario A, the customer device 107 is offline while the POS terminal 104 is online; in scenario B, the customer device 107 is offline while the POS terminal 104 is online; in scenario C, both the customer device 107 and the POS terminal 104 are offline; and finally, in scenario D, both the customer device 107 and the POS terminal 104 are online.

In the scenarios identified above, the POS terminal 104 and the customer device 107 are configured to exchange payment information between each other when either or both of the devices are offline. In the offline mode, the POS terminal 104 and/or the customer device 107 exchange payment information by (a) pairing or establishing connections using short-range communication networks, such as Bluetooth Low Energy (BLE), Bluetooth, Wi-Fi, Near Field Communication (NFC) or Radio-Frequency Identification (RFID) and (b) sending or receiving the payment information over the established communication channel to the device that is online or is most likely to get online. Alternatively, both devices exchange information since the identify of which device will come online may not be known. The payment information relates to information associated with or embedded in payment instruments and technologies that are used to effect payment transactions. Examples of payment instruments include: payment cards, virtual wallet, web or messaging applications that allow or are configured for money transfer, and payment proxies (depicted as "$payproxy" in the figure that has the syntax of a monetary indicator prefixed by an alphanumeric character). The monetary indicator can correspond to various currencies, e.g., dollar ($), euro (€), pound (£), rupee (■), yuan (¥), etc. Although use of the dollar monetary indicator ($) is used herein, it is to be understood that any currency symbol could equally be used.

The payment information also includes information required for processing a transaction, for example information manually input via a magnetic card reader or an RFID reader, etc., such as a PIN associated with the payment card, an amount of payment received from the customer, the item(s) acquired by the customer, a time, place and date of the transaction, and so forth.

In some examples, the POS terminal 104 includes a card reader (not shown) to receive a payment object, such as payment proxy. The POS terminal 104 reads data off the payment object and saves it as payment information. Subsequently, the POS terminal 104 can transmit such payment information through the short-range networks (depicted as radio signals) to a customer device 107. Alternatively, the POS terminal 104, if operating in an online mode, can also transmit the payment information to a payment service 108 through a long-range communication network 115.

In an embodiment, the POS terminal 104 is a standalone payment beacon that may not need to be constantly administered by a merchant 102. Instead, it can be installed at locations, e.g., national parks, restaurant tables, and remote locations, where the POS terminal 104 is able to receive and send payment proxies to and from proximate devices through short-range communication networks.

In another embodiment, the POS terminal 104 can correspond to a store or other place of business of the merchant, and thus, may be a fixed location that typically does not change on a day-to-day basis. In other types of businesses, however, the POS terminal 104 may change from time to time, such as in the case that the merchant operates a food truck, is a street vendor, is a cab driver, etc., or has an otherwise mobile business, e.g., in the case of merchants who sell items at buyers' homes, places of business, and so forth.

In yet another embodiment, the POS terminal 104 and/or the customer device 107 may comprise any sort of mobile or non-mobile device that includes an instance of a, mobile payment application that executes on the respective device.

The mobile payment application (e.g., in the form of a messaging application, a forum, a landing page, a web application, etc.) may provide POS-like functionality to the POS terminal 104 enable the merchant 102 (e.g., an owner, employees, etc.) to accept payments from the customers 106, for example in the form of payment proxies. Furthermore, the customer 106 too can send payments to the merchant 102 using the merchant application installed on or accessible via the customer device 107.

Coming back to the scenarios, in scenario A where the customer device 107 is offline and the POS terminal 104 is online, the customer device 107 is perceived to be the secondary device and the POS terminal 104 is primary, which means the POS terminal 104 submits the payment request to the payment service on behalf of the customer device 107. As shown in the figure, the dotted lines depict the capability to connect with the network 115 (thus, currently an offline device but can connect if the device gets online), while solid lines indicate actual connection (currently an online device).

The customer device 107 establishes a short-range, such as Bluetooth or BLE, network connection with the POS terminal 104. The customer device 107 then transmits payment information, e.g., $payproxy of the customer 106, and one or more characteristics associated with the transaction (i.e., the transaction information), such as a cost of the transaction, a time of day at which the transaction occurred, a day of the week at which the transaction occurred, a location at which the transaction took place, and an item that the customer 106 obtained, onto the POS terminal 104. Alternatively, the POS terminal 104 can request for the information, in response to which the customer device 107 transmits the payment information. Since the POS terminal 104 is online, the POS terminal 104 can send the transaction information (along with a payment request) to a payment service 108 over a network 115 substantially contemporaneously with the conducting of the transaction. As mentioned before, the network 115 may represent any one or more wired or wireless long-range networks, such as a Wi-Fi network, a cellular network, or the like.

In scenario B where the customer device 107 is online and the POS terminal 104 is offline, thus, the customer device 107 is perceived to be the primary device and the POS terminal 104 is secondary, which means the customer device 107 submits the payment request to the payment service on behalf of the POS terminal 104. The customer device 107 establishes a short-range, such as Bluetooth or BLE, network connection with the POS terminal 104. The customer device 107 then receives payment information, e.g., $payproxy associated with the merchant 102. The customer 106 accesses an instance of an e-commerce or POS application on the customer device 107 to enter the received payment proxy and optionally, obtain one or more characteristics associated with the transaction (i.e., the transaction information), such as a cost of the transaction, a time of day at which the transaction occurred, a day of the week at which the transaction occurred, a location at which the transaction took place, and an item that the customer 106 obtained, onto the POS terminal 104. Alternatively, the POS terminal 104 can push the information onto the customer device 107 through the short-range communication channel. The customer device 107 that is online can then send the transaction information (along with a payment request) to a payment service 108 over a network 115 substantially contemporaneously with the conducting of the transaction.

In scenario C where the customer device 107 and the POS terminal 104 are both offline, both the devices are secondary and either of them can become primary depending on which device gets online first, or in some cases, depending on which device is a preferred device. The customer device 107 establishes a short-range, such as Bluetooth or BLE, network connection with the POS terminal 104. The customer device 107 and the POS terminal 104 both exchange and store payment information, e.g., "$payproxy" associated with the merchant 102 and the customer 106, along with other transaction information. In one implementation, only the POS terminal 104 (or the customer device 107) collects the information relevant to processing of transactions in the offline mode. In another implementation, both the devices exchange and store information in the offline mode because the identity of the device that will go online first may be unknown. In some examples, the device responsible for communicating with the payment service 108 may be fixed. For example, the customer device 107 always connects to the payment processing system 108 irrespective of whether or not the POS terminal 104 comes online first.

In some examples, the customer device 107 and the POS terminal 104 may both race to connect with the payment service 108. Between the customer device 107 and the POS terminal 104, whichever goes online first (referred to as "primary device" hereinafter) switches boundaries between offline and online mode. The primary device can then interact with the payment service 108 through network 110. If the offline device (also referred to as the secondary device) has stored thereon relevant information for transaction processing, the secondary device can transmit the transaction information via short range network to the primary device. Subsequently, the primary device transmits the information to the payment service 108 via a long range communication network. If both the devices come into online mode at the same time, a contention resolution component stored within the customer device 107, the merchant device 104, or the POS terminal 104 can determine which device should connect to the payment service 108. In other cases, both the devices submit the payment request on behalf of the other, and the payment service processes the request based on stored rules. In one example, the payment service processes the request that arrives earlier. In another example, the payment service processes the request based on a risk score associated with the devices. The payment services 108 rejects the remaining request and sends a notification to the originating device indicating that the transaction is being processed through a duplicate request sent from another device. The payment service may also send an order confirmation number. In some cases, the primary device sends a notification and/or customer number to the secondary device as soon as the request is submitted to the payment service, thereby discouraging the secondary device to submit duplicate requests when the secondary device establishes network connectivity with the payment service 108.

The customer 106 or the merchant 102 accesses an instance of an e-commerce or POS application on the primary device to enter the received payment proxy and optionally, obtain one or more characteristics associated with the transaction (i.e., the transaction information), such as a cost of the transaction, a time of day at which the transaction occurred, a day of the week at which the transaction occurred, a location at which the transaction took place, and an item that the customer 106 obtained, onto the primary device. The primary device sends the transaction information (along with a payment request) to a payment service 108 over a network 115.

Due to the offline nature of the merchant and customer devices, there may be a finite time delay in conducting of the transaction and actual processing as one of the devices has to get online. In some implementations, the customer or the POS terminal may include a payment processing component to conditionally or provisionally approve a transaction based on stored risk data related to the customer or type of the offline transaction. This is further discussed with reference to FIGS. 3-4.

Finally, in scenario D where the customer device 107 and the POS terminal 104 are both online, the customer device 107 establishes any kind of network connection (e.g., Wi-Fi, BLE, Bluetooth, NFC, etc.) with the POS terminal 104. The POS terminal 104 stores payment information, e.g., "$payproxy" or credit card associated with the merchant 102 and the customer 106, along with other transaction information. In one implementation, only the POS terminal 104 (or the customer device 107) collects the information relevant to processing of transactions. In another implementation, both the devices exchange and store information. In some examples, the device responsible for communicating with the payment service 108 may be fixed. For example, the POS terminal 104 always connects to the payment processing system 108. After conducting an online transaction with one of the customers 106, the POS terminal 104 may provide the stored information (along with a payment request) to the payment service 108 over the network 115.

The scenarios described above describe devices that are operating in an offline or online mode, e.g., due to their current geographical location, and not necessarily out of choice. However, the description can be extended to devices, e.g., the POS terminal 104 may prefer to be in a certain mode based on application, time of day, convenience, ease of operation, and the like. For example, the POS terminal 104 can automatically transition between the online mode and the offline mode based on an array of different reasons other than simply a loss of network connectivity. For instance, the POS terminal 104 may transition to the offline mode in order to increase an efficiency of transactions conducted between the merchant 102 and the customers 106 as, in some implementations, transactions can be authorized provisionally based on risk-scores discussed in detail in FIGS. 3-4. The POS terminal 104 can also make this transition in response to a rate increase in sales volume being greater than a threshold, in response to an amount of transactions over a given time being greater than a threshold, in response to anticipating an increase in future transactions (e.g., based on historical sales data), or the like. In some instances, the POS terminal 104 may provide an option to the user to transition to the offline mode, rather than automatically transition to the offline mode.

In the scenarios mentioned above, the payment processing system (PPS) 110 of the payment service 108 receives the payment request sent by the online device, e.g., the POS terminal 104 or the customer device 107 as per the context. The PPS 110 stores, besides other components and data, a payment processing component. The PPS 110, through the payment processing component 120, parses the payment request to extract information regarding a transaction and the payment proxy of the customer and/or the merchant. The PPS 110 can identify the merchant or the customer based on the payment proxy and/or based on another identifier of a recipient, e.g., the merchant or the customer (e.g., email address, username, phone number, etc.). The PPS 110 connects to an internal database to determine identity of the merchant or the customer the financial account connected of the customer or the merchant connected to the payment proxy.

In accordance with various embodiments of the disclosed technology, the PPS 110 identifies the financial account of the sender or the recipient (the customer or the merchant) based on registration of the payment proxy. For example, the merchant or the customer, also referred to as user, may have previously created a payment proxy (e.g., $calistatepark) to be used with a service provided by the PPS 110 (e.g., a money transfer service), and entered financial account information through a GUI (e.g., an interactive payment receiving interface) of the payment service application of the PPS 110. In this example, the PPS 110, in turn, associates the financial account information with the user's newly created payment proxy in this registration process. In other words, upon submission of information by the user, the PPS 110 automatically registers the financial account and the payment proxy with the PPS 110 on behalf of the user. The user can submit financial account information for one or more financial accounts. Associations of the one or more financial accounts with the recipient user's payment proxy can be stored on the PPS 110. Information of the financial accounts can be used for future payment transactions (e.g., money transfers).

If no financial account information is identified for the sender user or the recipient user, the PPS 110 can send a message (e.g., a financial account request message) to the user requesting that financial account information to be submitted. The message can be a confirmation message that includes a secure link to enter the financial account information, such as a debit card number or a credit card number and associated authentication information (e.g., expire date, ZIP Code, PIN number, or security code). For example, the user can simply input financial account information, such as a debit card number or a credit card number.

When the financial account information is identified for both the sender user and the recipient user (either initially or later submitted through the confirmation message), the PPS 110 sends a request to transfer money, e.g. via the issuer network 112 or the acquirer network 114. In particular, to transfer money between the sender user and the recipient user (identified based on the payment proxy), the PPS 110 can operate as a gateway or a middleman.

To operate as a gateway, the PPS 110 can identified debit card accounts, e.g. stored at the servers 112 and 114, for both the sender user and the recipient user. The PPS 110 can submit a request to an appropriate card issuer e.g., to the sender user's card issuer or to the receiving user's card issuer, to transfer money. For example, the request can be sent over debit rails. That is, a debit card network can receive the request and can carry out the request to transfer money. The appropriate card issuer can receive and process the request by transferring money to the appropriate card account.

To operate as a middleman, the PPS 110 can receive a payment amount by processing a card, e.g., a credit card or a debit card, of the user sender and hold the payment amount. The PPS 110 can push the payment amount, e.g., over debit rails, to a debit account of the recipient user. Instead of holding the payment amount, the PPS 110 can also forward the payment once the recipient user links the account with the PPS 110. Alternatively, the PPS 110 can generate a transaction ACH that debits an amount from the sender bank account and can credit the amount into a recipient bank account, e.g., using ACH, or onto a debit account, e.g., over debit rails, of the recipient user.

In some cases, the PPS 110 sends an indication of whether the payment proxy has been approved or declined, back to the customer device 107 and/or the POS terminal 104.

Figure 2:
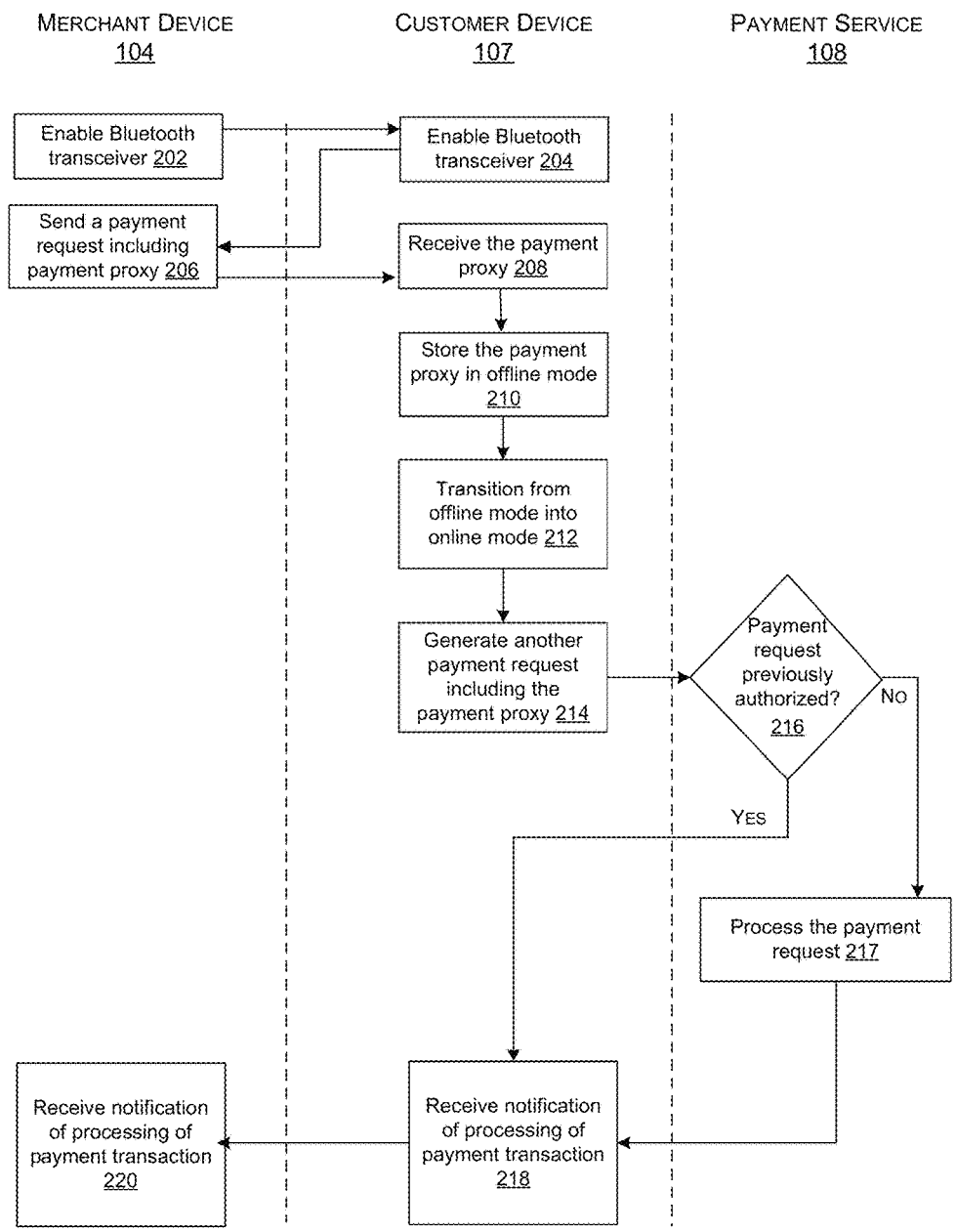
FIG. 2 is a flow diagram illustrating an example method of exchanging information between the customer and the merchant in various offline-online scenarios, according to an embodiment of the present subject matter.

FIG. 2 is a flowchart that illustrates an exemplary method to process transactions occurring on a point-of-sale (POS) terminal or a customer device when both the devices are in an offline mode, according to an embodiment of the present subject matter. For convenience, the process 200 is performed between two parties of a transaction, namely, a merchant device, e.g., a POS terminal 104, and a customer device 107. Furthermore, for ease of explanation, both the POS terminal and the customer device are assumed to be offline.

FIG. 2 illustrates, at blocks 202 and 204, an offline POS terminal 104 and an offline customer device 107 enable a short-range communication network channel, for example, through short-range Bluetooth technology, in the absence of any available long-range communication technology, such as the Internet. Thus, the devices may enable wireless transceivers to allow neighboring devices to detect their presence and pair with them by requesting for an authentication password, and/or the like.

In one implementation, one of the devices may promote itself to be a primary device that receives information, e.g., payment proxy, from other devices and is responsible for initiating a payment transaction with a remote payment service, e.g., payment service 108, while the remaining device is the secondary device that transmits information. The primary device responsible for communicating with the payment service may be dynamically selected or fixed beforehand and as such only one device between the POS terminal 104 and the customer device 107 may be the primary device. For example, the customer device 107 always receives information and connects to the payment service 108 irrespective of whether or not the POS terminal 104 comes online first.

In another implementation, the secondary device can change its status into a primary device as soon as it switches into an online mode. In yet another implementation, both the devices are primary devices that send and receive payment information in the offline mode because the identity of the device that will go online first may be unknown. As such, the customer device 107 and the POS terminal 104 are both capable to connect with the payment service 108. Thus, both the devices share mutual payment proxies giving both the devices the capability to process payment transactions when they get online. For the ease of explanation here, assume that the customer device 107 is the primary device or the one likely to get online first.

At block 206, the secondary device (e.g., the POS terminal 104) transmits payment information e.g., "$payproxy" associated with the merchant 102. While operating in the offline mode, the merchant may transmit a payment proxy associated with a merchant's financial account, in order to process a transaction. The payment proxy is registered with the payment service 108. The POS terminal 104 transmits this information in two ways: in the first way, the POS terminal 104 makes this information publically available through, e.g., transceivers, such that the information is viewable by neighboring devices without an actual pairing. For this, the customer device 107 may include an application that detects devices with enabled Bluetooth. On detection, the customer device 107 views the payment information on the list of devices available in the communication field of the customer device 107, and selects accordingly. In the second way, the POS terminal 104 shares the information with the paired devices only. For this, the customer device 107 initiates pairing with the POS terminal 104. After successful pairing, the two devices can receive and send information, including the payment proxy of the merchant 102.

At block 208, the primary device (e.g., the offline customer device 107) receives a payment request from the POS terminal 104, where the payment request includes the payment information, e.g., "$payproxy" associated with the merchant 102 and the customer 106, and other transaction information, such as money transfer amount corresponding to the purchased product or service, and additional identifier information corresponding to the transactions, for example, by accessing a local data-store or directly from the memory associated with the secondary device 104. Examples of transaction identifier information include time at which the transaction occurred, the location of the merchant's store, history of previous transactions between the customer and the merchant, information regarding prior payment instrument approval (i.e., designating the customer as trusted), customer information, and/or customer payment history, information regarding stolen cards and/or known nefarious customers or merchants (i.e. customers who are known to have payments declined), and the like. In some cases, the secondary device encrypts or packages the payment request using bloom filters with hash functions. As shown, only the customer device 107 collects the information relevant to processing of transactions in the offline mode, while the POS terminal 104 is the dormant device that provides the information.

In case the secondary device is a customer device, additional precaution may be taken to protect the customer's payment proxy. To that end, the customer device 107 encrypts or packages the payment proxy or the payment request using bloom filters with hash functions. The bloom filter may use the hash functions to determine information about a customer without the risk of the customer's payment proxy being stolen or otherwise used in a nefarious manner (e.g., through reconstruction). In various embodiments, the hash functions hash or map the customer's payment proxy to designated array positions of a bloom filter array to test whether the criterion is met (i.e., a positive match occurs when all of the mapped-to array positions have a value of one "1"; no match occurs, and the criterion is not met, if any of the array positions contain a zero ("0")). In some embodiments, the payment proxy may be truncated to a number less than the standard 16 or 17-digit identifier number. For example, the hash functions may truncate a payment proxy to a 10-digit number, and map the 10-digit number to the bloom filter array. Though bloom filters with hash functions are described herein, it is imagined that the other encryption techniques may be used to maintain the security of customer information, such as hash tables, simple arrays, and the like At block 210, the primary device 107 stores (e.g., in batches) the payment proxies for each of the transactions between the primary device 107 and other devices, including the secondary device 104, which are still in offline mode. Since the primary device is in offline mode, any connections to the payment service 108 are difficult to make, especially if the payment service 108 is remote. As will be discussed in FIG. 4, the transactions can be provisionally authorized based on risk scores.

At block 212, the primary device 107 transitions from the offline mode to an online mode. For example, the primary device 107 may get in the online mode when the customer 106 physically places the primary device 107 in a different geographical location where long-range communication network is available. Alternatively, the primary device 107 turns off power saving or airplane mode and connects with a existing long range network, e.g., Wi-Fi.

If the primary device 107 is unable to get online for a predetermined time and/or the POS terminal 104 comes online, the primary device 107 can send the encrypted payment request back to the POS terminal 104 by appending the payment proxy of the customer. Thus, between the customer device and the POS terminal, whichever goes online first switches boundaries between offline and online modes. In one example, the switching manifests itself in the online device establishing a communication channel with the payment service 108.

If both the devices come into online mode at the same time, the method resolves the contention between the customer device 107 or the POS terminal 104 by selecting which device should connect to the payment service based on pre-defined selection criteria that is further computed based on factors, such as merchant or customer preference, cost of transfer, efficiency, power levels, risk score, the order in which requests are received, signal strength between the online device and the payment service, transaction history, customer data, and/or customer history, and the like. In various embodiments, the merchant and/or payment service may designate a tolerance by inputting a selection criteria for customer devices (i.e., a merchant will allow the customer device 107 to connect with the payment service if it comes online first if the risk percentage associated with the customer is less than 5%). In other embodiments, the payment service 108 may compute and store the selection criteria corresponding to a customer device or customer in a merchant profile. For example, a filter designated to determine whether a payment card identifier of a customer is associated with even one fraudulent transaction may be set a high risk percentage (i.e., >10%).

At block 214, the primary device 107 responsive to establishing connectivity with the payment service 108, the primary device 107 interacts with the payment service 108 through the established long-range communication network technology. To this end, the primary device 107 sends to the payment service 108, the stored and optionally, encrypted payment request. The payment request, as mentioned before, includes the payment proxy of the merchant, and additional relevant information for transaction processing, which the POS terminal 104 had transmitted via short range network to the online device. Subsequently, the online device transmits the information to the payment service via a long range network, for example, by creating a message through a web application, a merchant application, a forum, a messaging application, a social networking website, and the like.

At block 216, the payment service 108 determines whether it has previously authorized the payment transaction, e.g., based on a request received from the POS terminal 104. If "Yes," the payment service 108 can either reject the request from the customer device 107 or process the request by transferring 'null' funds into the customer account. Accordingly, the payment service 108 sends a notification indicating the status of transaction to the customer device 107 and the POS terminal 104 at steps 218 and 220 respectively. In some cases, the payment service 108 may be waiting to receive the request from a specific device before processing.

However, if the determination to block 216 yields a "No," the transition flows to block 217. At block 217, the payment service 108 receives the encrypted payment request and parses it to extract the payment proxy and money transfer amount. The payment service 108 then requests card networks, issuers and acquirers for approval for the transactions that occurred while one of the devices is in offline mode. The payment service 108 also updates the merchant profile with the transaction data, and may add new trusted customers, and the respective customer information, for subsequently approved transactions and/or customer information for subsequently declined transactions.

At block 218, the payment service 108 sends a notification of transaction status indicating success or failure of the transaction to the primary device 107, which then sends a notification to the POS terminal 104 via short-range or long-range communication channel, at block 220.

Figure 3:
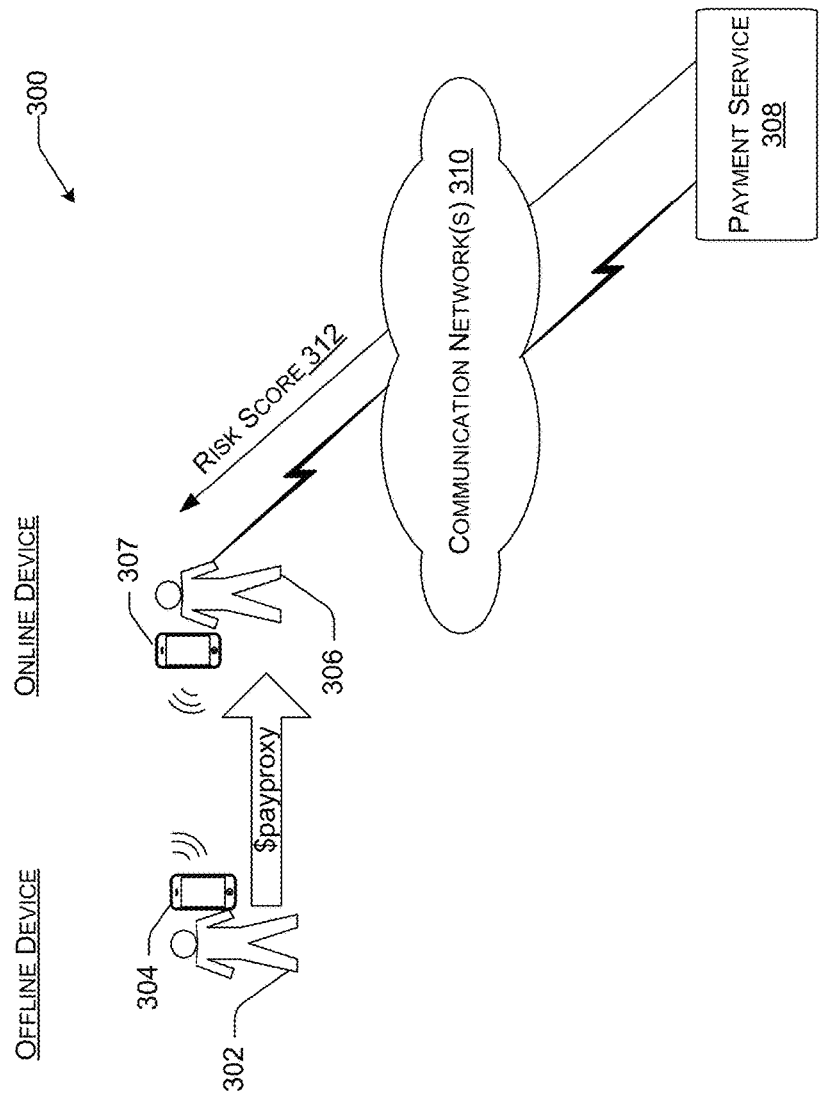
FIG. 3 is a network diagram illustrating interaction between a merchant device or a customer device, either or both of which are operating in offline-mode, and a payment service for processing an offline payment transaction, according to an embodiment of the present subject matter.

FIG. 3 is a network diagram 300 illustrating interaction between a payment service, and a merchant device or a customer device, either or both of which are operating in offline mode, for processing an offline payment transaction, according to an embodiment of the present subject matter.

The environment 300 includes a merchant 302 operating a mobile point-of-sale (POS) terminal 304 (with an in-built or a card reader associated thereto) interacting with customers 306 (also referred to as "user" or "consumer") connected to their respective customer devices 307 (e.g., mobile computers or phones). In one implementation, the POS terminal 304 can accept one or more payment objects presented by a customer 307 towards a payment transaction for a product and service. The transaction is processed and fulfilled via the POS terminal 304 and the payment service 308 (that includes, among other entities, the payment processing system, and an acquirer, an issuer, and/or a card processing network), coupled communicatively through the communication network 310. The network 310, in one implementation, is a wide area network, such as the Internet, and may include a wireless network, such as a cellular network, a cloud network, a local wireless network, such as Wi-Fi, and is similar to communication network 122.

Either the customer device 307 or the POS terminal 304 or both can be offline at the time of the payment transaction. Again, the device that is online (or is likely to get online) is assumed to be primary as it is responsible for submitting the payment request while the offline device is secondary and is only responsible for providing its payment proxy. The offline and the online devices pair with each other. In other implementations, the offline device (e.g., POS terminal 304) publically transmits its payment proxy, e.g., through beacon mechanisms with no requirement of actual pairing or local connection.

The online device (e.g., customer device 307) receives the payment proxy and creates a payment request on behalf of the offline device 304 and submits to a payment service 308. The payment request also includes information indicating that at least one party of the transaction is offline.

In response to the payment request, the payment service 308 sends to the online device 307 a risk score 312 corresponding to the offline device 304 via a network 310. Alternatively, the online device 307 may also have the risk score (also referred to as health data) in a local memory. The online device 307 can also request the POS terminal 104 to retrieve such information from its memory which may be the latest value, and therefore more valuable than the local value in the customer device 107. The devices may update the risk score with the latest value from the payment service 108 when the devices enter the online mode. In some embodiments, the risk score may be stored in association with one or more applications on the online device 307.

In various embodiments, the payment service 308 computes the risk score for the merchant 302 based on the merchant profile, which may include information related to past transaction history, merchant information, chargebacks, and/or any default transaction behavior. For example, the customer 306 may want the risk score to be based on a) record of past transactions conducted with a customer or a group of customers, including any fraudulent or default transactions, b) the number of times a merchant requests re-authorization, etc.

Similarly, the payment service 308 also computes the risk score for the customer 306 based on the customer profile, which may include information related to past transaction history, customer information, and/or any default transaction behavior. For example, the merchant 302 may want the risk score to be based on a) whether a customer has purchased any goods or services from the merchant in the past, b) whether each known customer has recently purchased goods and/or services from a competitor of the merchant, c) whether the customer has spent over a certain amount, say $1000 with the merchant, and d) whether the customer is a member of a merchant loyalty program.

The risk score may be an alphanumeric value, which may be categorized into different levels based on static or dynamic threshold values. For example, risk scores between 1-4 may be low risk, 5-7 may be medium risk, and 8-10 may be high risk.

One method of computing risk scores based on past or current transactions is as follows: the POS terminal 304 and/or the customer device 307 may use a bloom filter with a hash function to make the determination. In such an embodiment, the hash functions in the bloom filter map or hash a payment proxy to an array stored in the bloom filter to determine if the payment proxy has (most likely) been used in a previous successful transaction. One skilled in the art understands that a bloom filter may have a false positive result. Thus, if the payment proxy matches to all ones "1's" in the bloom filter array, the probability is high that the payment proxy has been used in a previous successful transaction, and thus recognizes the merchant as a trusted merchant. The false positive rate may be managed by optimizing the size of the bloom filter.

In various embodiments, responsive to recognizing the merchant as a trusted merchant, the customer device 307 may automatically proceed with the transaction. In some embodiments, the payment service 308 may provide, via a graphical user interface (GUI), an option for the merchant to select either proceeding with or cancelling the transaction. Thus, based on the risk score, the customer device 307 may confirm whether or not it wants to proceed with the transaction. If the risk score is acceptable, the customer device 307 sends to the payment service, in an online mode, encrypted payment request associated with the current transaction. For each transaction, the payment request may include the transaction data (i.e., date, time, amount of the transaction, item(s) purchased, etc.), payment proxy, customer data, and any other relevant information. The payment service 108 then parses and processes the payment transaction by determining the connection between the payment proxy and the merchant's financial account.

In some cases, the bloom filter may determine there is no match between the payment proxy and the array stored in the bloom filter (i.e., at least one position of the payment proxy is mapped to contains a zero "0"). Responsive to the determination that there is no match, the customer device 307 may inform the merchant 302 that the payment proxy has not been used in a previous successful transaction with the merchant 302. Optionally, the customer 306 may try using some other payment instrument. In various embodiments, responsive to determining there is no match, the customer device 307 may designate the merchant as an untrusted merchant, and/or may warn the customer of the increased risk in processing transactions with the merchant while offline, and update the risk score in the payment service 308 to this effect.

In the illustrative example, the customer device 307 may provide, via a graphical user interface (GUI), an option for the customer to proceed with or to cancel the transaction. In such examples, the customer may choose to accept the risk of an unsuccessful transaction. In some examples, the customer device 307 may automatically cancel the transaction. Responsive to allowing a transaction with no match to occur, the customer device 307 may flag the transaction as risky.

When the customer device 307 transitions from the offline mode to the online mode and responsive to establishing network connectivity, the customer device 307 may send, to the payment service 308, the stored transaction data. The payment service 308 may request approval for the transactions that occurred while in the offline mode. The payment service 308 may also update the merchant profile with the transaction data, and may add new trusted customers, and the respective customer information, for subsequently approved transactions and/or customer information for subsequently declined transactions.

The payment service 308 processes the payment request by parsing the payment request to obtain payment proxy, and the financial account connected thereto. The payment service 308 processes the transaction by electronically transferring funds from a financial account associated with the customer to a financial account associated with the merchant. As such, the payment service 308 may communicate with one or more computing devices of a card payment network 114 or 116, e.g., MasterCard®, VISA®, over the network 110 to conduct financial transactions electronically. The payment processing component can also communicate with one or more computing devices of one or more banks over the network 310. For example, the payment processing component may communicate with an acquiring bank, an issuing bank, and/or a bank maintaining customer accounts for electronic payments.

An acquiring bank may be a registered member of a card association (e.g., Visa®, MasterCard®), and may be part of a card payment network. An issuing bank may issue credit cards to buyers, and may pay acquiring banks for purchases made by cardholders to which the issuing bank has issued a payment card. Accordingly, in some examples, the computing device(s) of an acquiring bank may be included in the card payment network 114 or 116 and may communicate with the computing devices of a card-issuing bank to obtain payment. Further, in some examples, the customer may use a debit card instead of a credit card, in which case the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

Figure 4:
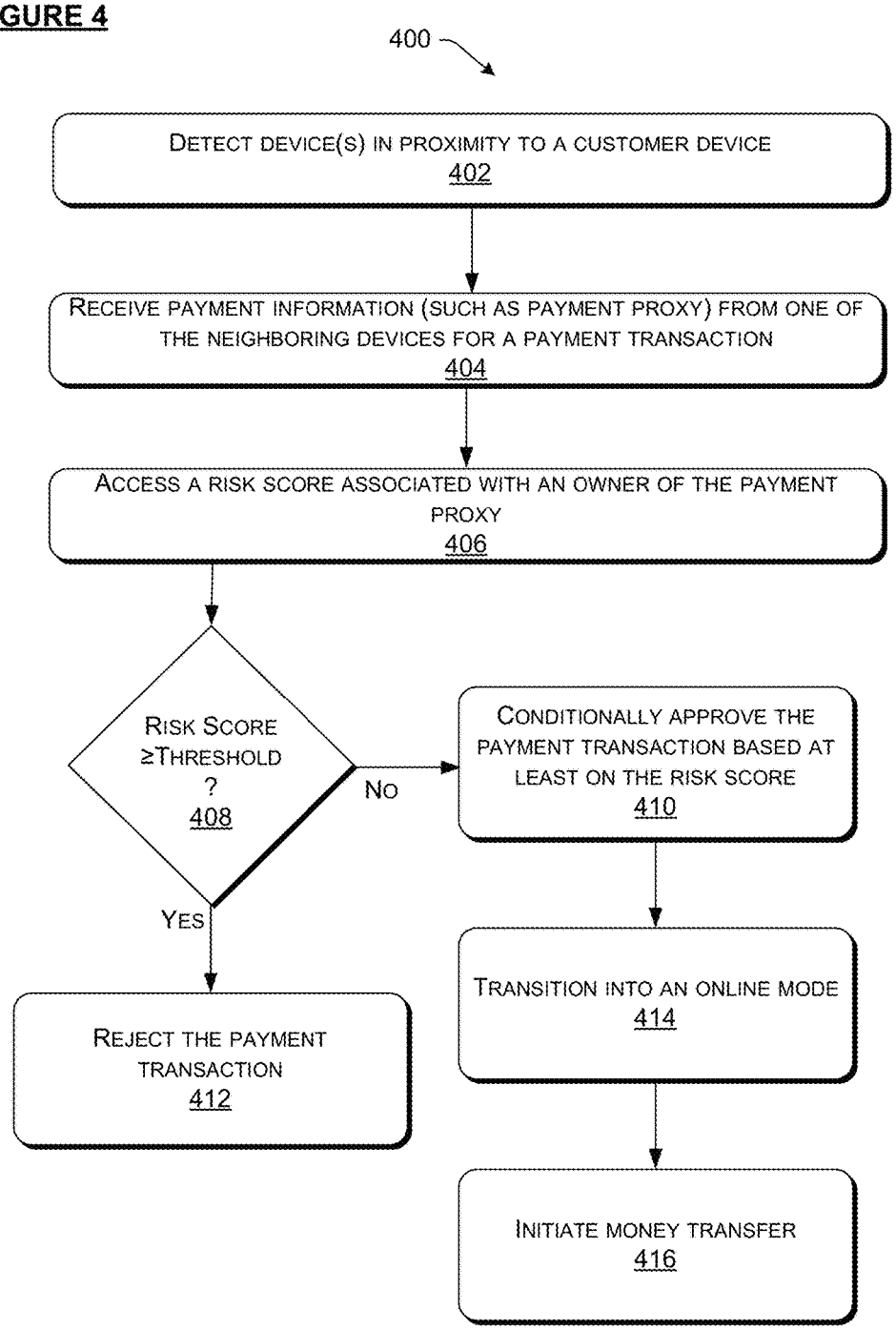
FIG. 4 is a flowchart that illustrates an exemplary method to process, based on risk scores, transactions occurring on a point-of-sale (POS) terminal or a customer device when both the devices are in an offline mode, according to an embodiment of the present subject matter.

FIG. 4 is a flowchart that illustrates an exemplary method 400 to process, based on risk scores, transactions occurring on a point-of-sale (POS) terminal or a customer device when both the devices are in an offline mode, according to an embodiment of the present subject matter. For convenience, the process 400 is performed between two parties of a transaction, namely, a merchant device, e.g., a POS terminal 104, and a customer device 107. Furthermore, for ease of explanation, both the POS terminal and the customer device are assumed to be offline.

FIG. 4 illustrates, at blocks 402, a customer device 107 (operating in an offline mode) detects devices in proximity to the customer device 107. For example, the first device enables its wireless transceivers, for example, Bluetooth transceiver, in the absence of any available long-range communication technology, such as the Internet. In response, other devices with enabled wireless transceivers and in detectable range of the first device, can be paired with the first device by exchanging an authentication password, security token and/or the like. In other cases, the first device need not connect with the other devices as long as the other devices are transmitting information publically.

At block 404, the customer device 107 receives payment information e.g., "$payproxy" associated with a neighboring device, such as the POS terminal 104. While operating in the offline mode, the merchant may transmit a payment proxy associated with a merchant's financial account, in order to process a transaction. The payment proxy is registered with the payment service 108. The POS terminal 104 transmits this information in two ways: in the first way, the POS terminal 104 makes this information publically available through, e.g., transceivers, such that the information is viewable by neighboring devices without an actual pairing. For this, the customer device 107 may include an application that detects devices with enabled Bluetooth. On detection, the customer device 107 views the payment information on the list of devices available in the communication field of the customer device 107, and selects accordingly. In the second way, the POS terminal 104 shares the information with the paired devices only. For this, the customer device 107 initiates pairing with the POS terminal 104. After successful pairing, the two devices can receive and send information, including the payment proxy of the merchant 102. Thus, the first device receives a payment request from the POS terminal 104, where the payment request includes the payment information, e.g., "$payproxy" associated with the merchant 102 and the customer 106, and other transaction information, such as money transfer amount corresponding to the purchased product or service, and additional identifier information corresponding to the transactions, for example, by accessing a local data-store or directly from the memory associated with the secondary device 104.

At block 406, the customer device 107, which is offline or may have transitioned into the online mode, accesses a risk score associated with the merchant 102.

At block 408, the customer device 107 determines based on the risk score, whether the transaction can be provisionally processed or not. For example, if the risk score is above a threshold level, the customer device 107 conditionally approves the transaction in block 412. In other words, the customer device 107, if online, requests the payment service 108 to transfer funds between the customer and the merchant. If offline, the customer device 107 sends a notification to the POS terminal 104 that the transaction is processed but in reality, processes the transaction only after either of the devices transition into the online-mode.

If the risk score is lower than the threshold level (as shown in block 408), the customer device 107 rejects the transaction at block 410. Optionally, the merchant or the customer can retry when either of the devices transitions into the online mode, e.g., by executing block 408. For example, the payment service 108 may have updated scores different from the local scores in the database of the primary or secondary devices and thus, the risk score may be different in the second cycle.

At block 414, the customer device 107 transitions into the online mode. The method may include a step to check whether the transaction was conditionally approved. If the determination yields a "Yes," the transfer of funds is initiated through the payment service 108 at block 416. In some cases, the risk scores may be re-checked to secure the authorization. If the determination yields a "No," the risk scores are re-checked using the updated risk scores in the payment service 108 servers. The above method can be applied when the merchant device is the primary device as well.

Figure 5:
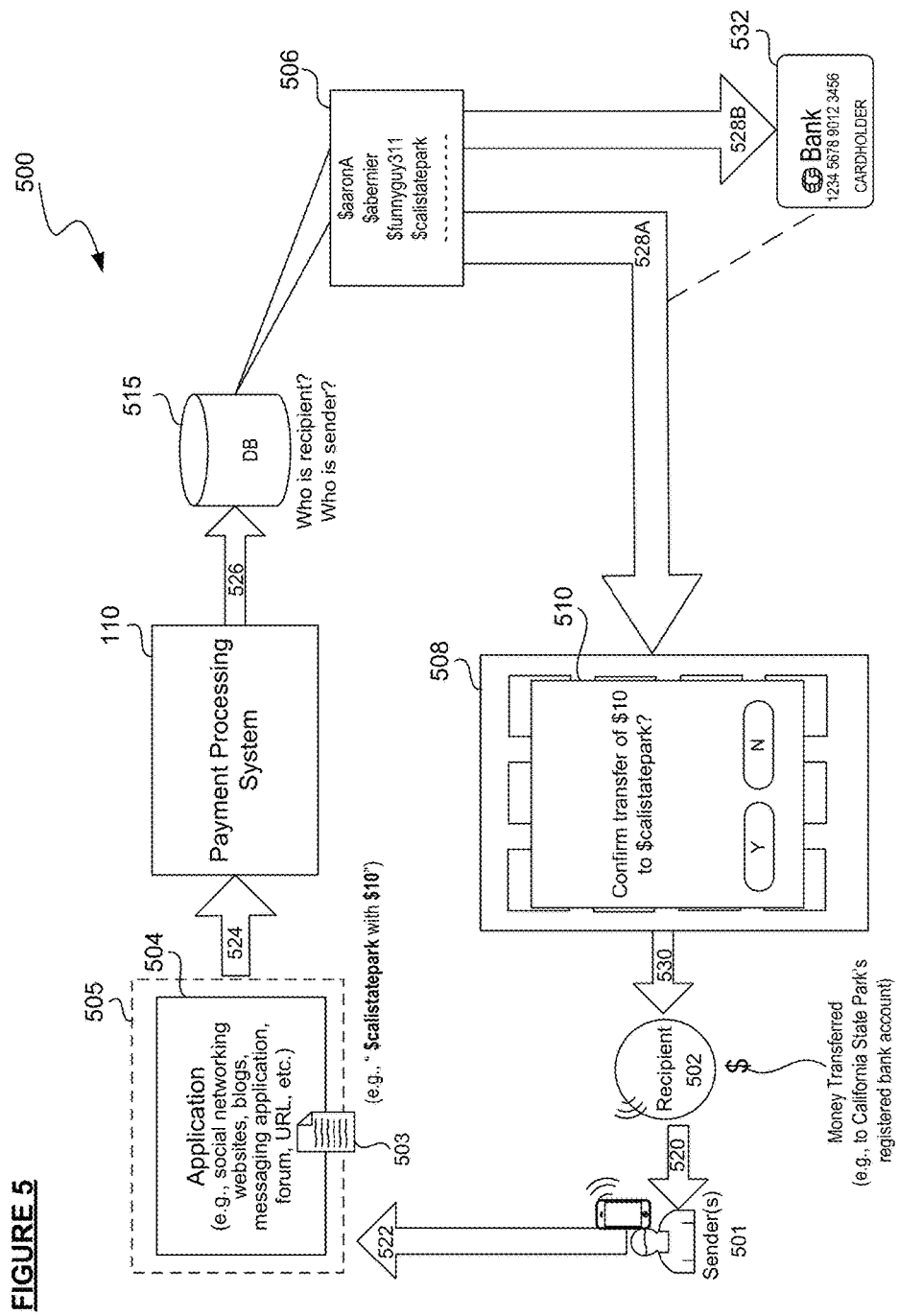
FIG. 5 is a dataflow illustrating an example overview of a money transfer process between a sender and a recipient, by use of a payment proxy within the context of an application, in accordance with some embodiments of the disclosed subject matter.

FIG. 5 is a dataflow illustrating an example overview of a money transfer process 500 between a sender 501 and a recipient 502, by use of a payment proxy within an application context, in accordance with some embodiments of the disclosed subject matter. The process 500 involves communication between a computer system 505 of an application 504 ("e.g., messaging portal 505") and the PPS 110. The messaging portal 505 can be, or include, the Web server or application server, that is employed by a content provider. The content provider can include social networking, blogging, text messaging, micro-blogging services. In some embodiments, messaging portal 505 may also refer to an application or webpage of an e-commerce or retail organization that offers products and/or services. Such websites can provide an online form "form" to complete before or after the products or services are added to a virtual cart. The online form may include fields to receive user interaction and engagement. Some of these fields may be configured to receive payment information, such as payment proxy, in lieu of payment cards, such as credit cards, debit cards, prepaid cards, gift cards, virtual wallets, etc.

Note that while the process 500 is described for a particular sender sending money to the recipient 502, in other embodiments, the process 500 can be executed for multiple senders (e.g., sender 501-1-N, where N is an integer greater than N), where each sender 501 can send money to one or more recipients 502 via the set of operations involved in the process 500. In such embodiments, the individual payment amounts from the multiple senders can be aggregated into an accumulated payment amount that gets transferred, by the PPS 110, to the recipient 502. Also, the process can be reversed, that is to say the recipient can be the active party that receives a payment proxy of the senders and submits the payment request on their behalf.

The process 500 starts with the sender 501 obtaining a payment proxy from the recipient 502 at block 520. For this, a device of the sender 501 may establish a communication channel with a device of the recipient 502 through Bluetooth or BLE communication technology. The device of the recipient 502 may be a beacon that, persistently or on activation by touch, voice or audio input, generates its payment proxy (e.g., $calistatepark). This is shown through block 508.

At block 522, the sender 501 accesses an application 504, or website, executed or hosted by the messaging portal 505, as indicated by block 522. The website can be, for example, a social networking website, a microblog, a blog, or any other media channels that enable communication between users of the website. In some embodiments, the messaging portal 505 authenticates the sender 501 before allowing access. Authentication can involve, for example, verifying login credentials submitted by the sender 501, e.g., by using a sender device of the sender 501, such as the customer device 107, to the messaging portal 505. The login credentials can be a username and password that correspond to a user account registered with the messaging portal 505. In some embodiments, the username can be an email address or a phone number of the sender 501, where such username can operate as a sender identifier of the sender 501. In some embodiments, the sender identifier is submitted in addition to a username and is stored by the messaging portal 505 in association with the username for the newly created user account registered with the messaging application 504.

In operation, the messaging portal 505 works in coordination with an API associated with the PPS 110 to monitor the content made or created by the users of the messaging portal 505. The content can include, for example, text messages, email messages, user messages, posts, comments, user interactions, etc. (hereinafter, "user messages," for ease of discussion of the process 500). The content may be generated based on the information being transmitted by the "paired neighboring device" e.g., recipient 502. The sender 501 may generate a message by entering the transmitted payment proxy of the recipient in a "To" field. Alternatively, such field is automatically prefilled following selection of the payment proxy from a list of proxies visible to the sender 501 in the application 504.

The messaging portal 505 monitors the user messages to detect an indication of an intent to transfer money from a particular user (e.g., the sender 501) to a particular recipient (e.g., the recipient 502). The messaging portal 505 detects the indication of the intent based on an identification of a syntax, or more specifically, an input, within any one of the user messages that has a particular syntax. In some embodiments, the detection can be based on a parsing of the user messages to identify the syntax. In some embodiments, any syntax in a form field dedicated for payment proxy can be identified as intent. As discussed above, the syntax includes a monetary indicator preceding one or more alphanumeric characters. The input having the syntax is representative of a payment proxy at which the sender 501 wishes to send money. The input can be a string of characters that include the monetary indicator and one or more alphabetic characters. For example, the input is $calistatepark. In another example, the input is $aaron. The input can be a string of characters that include the monetary indicator and one or more alphabetic characters and numeric characters. For example, the input is $redcross123. In another example, the input is $aaron315.

The sender 501, for example, accesses a social networking website and enters a message 503, "$calistate park with $10 for parking, license plate 7R567," on the social networking website (e.g., a social profile page of the sender 501 or another user). The web server can identify the sender user's intent to transfer money to the recipient user 502 based on an identification of the payment proxy "$calistatepark" included in the posted message 503. Note that the sender 501 may not have any personal relationship with the recipient 502, and as such, may not know a phone number, an email address, or any other personal contact information of the recipient 502. However, the sender 501 can send money to the recipient 502 by simply specifying, in the message 503, the payment proxy associated with the recipient 502. The recipient 502 can "advertise" or otherwise display a payment proxy of the recipient 502 to be seen by the sender 501, e.g., on a website (e.g., personal homepage), on a billboard, on a pamphlet, on a flyer, etc. The sender 501, who wishes to send money to the recipient 502, e.g., as support for the recipient 502, can use the displayed payment proxy to send money.

Referring back to the process 500, upon identification of any message that includes an input having the syntax, the messaging portal 505 sends a notification message (e.g., an API request) to the PPS 110, as indicated by block 524. The notification message can include the identified user message and any other data associated with the user message and/or the user who has created that user message (e.g., the sender 501). The other data, or information, can include, for example, a sender identifier associated with the user. Such identifier can include, for example, an email address of the sender 501 or a phone number of the sender 501. As discussed above, the sender identifier can be derived from a user account registered with the messaging portal 505.

Upon receiving the notification, the PPS 110 parses the user message to identify the input having the syntax (i.e., the payment proxy), and more specifically, to identify who the recipient of the money transfer is, as indicated by block 526. Based on the payment proxy, the PPS 110 can identify a recipient financial account. In some embodiments, the PPS 110 identifies the recipient financial account by accessing a database, e.g., the DB 515, which maintains data 506 relating to user accounts and associated financial accounts in one or more database tables. In such embodiments, the PPS 110 performs a database lookup to determine who is the recipient associated with the payment proxy (e.g., Is there a user of the PPS 110 that is associated with the payment proxy $calistatepark?). For example, the PPS 110 searches one or more database tables of the DB 515 for, e.g., $calistatepark. An example of the database tables storing the data 506 is shown in FIG. 7 (e.g., database tables 702, 704, and 706). Within the database tables of the DB 515, the recipient user account can be represented by an identifier associated with the recipient. The identifier can include, for example, an email address, a telephone number, an application ID, a device ID, or biometric data (e.g., fingerprint, iris, voice, facial features, etc.). In some embodiments, the recipient user account is the payment proxy.

Upon identifying the recipient user account, the PPS 110 identifies the recipient financial account associated with that user account and proceeds to process the transaction, as indicated by block 528A. In some embodiments where the recipient user account is the payment proxy, the PPS 110 simply identifies the recipient financial account without first identifying the recipient user account registered with the PPS 110. To identify the recipient financial account, the PPS 110 can determine the financial account information that identifies that recipient financial account. The financial account information can include, for example, card number, expiration date, CVV, billing address, routing number, etc. The recipient financial account can be associated with, for example, a debit payment card 532.

If the PPS 110 is unable to identify the recipient financial account, the PPS 110 can send a message to request financial account information from the recipient 502 (e.g., a confirmation message that includes a financial account request message), who can provide financial account information (e.g., debit card information), as indicated by block 528B. The message can be sent to the recipient by using an identifier of the recipient ("recipient identifier") that is stored in association with the recipient user account (and/or in association with the payment proxy). The recipient identifier can include, for example, an email address or a telephone number. For example, the PPS 110 sends an email message to an email address of the recipient 502, where the email message includes a hyperlink that redirects the recipient 502 to, e.g., a webpage that allows submission of debit card information associated with the debit card 532. In another example, the PPS 110 sends a text message to a telephone number of the recipient 502, where the text message includes a hyperlink similar to the one included in the example email message. In yet another example, knowing that the transaction is offline, the PPS 110 sends the notification through the sender 501 since the sender 501 is in a local network of the recipient 502, and hence, reachable through BLE or Bluetooth networks.

The PPS 110, upon notification, also determines who the sender 501 is (as indicated by block 526), and more specifically a financial account of the sender 501 ("sender financial account") to process the money transfer. The PPS 110 can identify the sender 502 by using the other information, such as the sender identifier, included in the notification message from the messaging portal 505. In particular, the PPS 110 accesses the database 515, which maintains data 506 about user accounts and associated financial accounts in one or more database tables, to identify whether, e.g., the email address of the sender 501, exists in the database 515. Upon finding the sender identifier, the PPS 110 determines the sender financial account. Note that the sender 501 may not already have an account with the PPS 110, but would still be able to transfer money to the recipient 502 by use of the payment proxy. In such scenario where the sender 501 is not yet known to the PPS 110, the PPS 110 sends a message (e.g., a confirmation message of the intent of the sender 501 to transfer money) to request for financial account information, as indicated by block 528B. The financial account information identifies a sender financial account, which can be associated, for example, with a payment card, such as the debit card 532.

In addition to identifying the sender financial account and the recipient financial account, the PPS 110 also determines a payment amount that the sender 501 desires to send to the recipient 502. The PPS 110 can determine the amount by analyzing the message 503 to identify a second input that has the syntax of the monetary indicator preceding one or more alphanumeric characters. In particular, the PPS 110 parses the message 503 to identify the second input representative of the payment amount. The second input can be a string of characters that includes the monetary indicator and one or more numeric characters. For example, the amount can be identified based on the input, "$25," included in the message 503. In some embodiments, the PPS 110 can determine the amount by analyzing the message 503 to identify an input that includes one or more numeric characters, without the input having the syntax. For example, the PPS 110 parses the message 503 to identify the amount based on an identification of the input "25." In some embodiments, the amount can be parsed from the message 503 based on natural language processing and/or context of the message 503. In yet another embodiment, the money transfer amount can be a dynamic value changing based on time, for example. As in the case of parking, a meter connected to the recipient device can charge the customer 106 the amount owed after the customer moves his vehicle out of a parking lot, the timer ending when the customer leaves the geo-fence of the recipient 502. In another embodiment, a patron at a restaurant may be charged the amount of the meal when the patron leaves the geo-fence of the restaurant.

Once both the sender financial account and the recipient financial account are identified (or submitted to the PPS 110 via the confirmation message), the PPS 110 proceeds at block 530 to initiate a transfer of money. Initiating the money transfer can include, for example, the PPS 110 communicating a request to a card issuer of the sender 501 to transfer the money. In another example, the PPS 110 processes a card of sender 501 e.g., a credit card or a debit card, holds the payment amount on behalf of the recipient 502, and can forward the payment amount to the recipient 502 once a financial account has been linked with the PPS 110. Alternatively, the PPS 110 can generate a transaction using ACH that debits an amount from a bank account of the sender 501 and can credit the amount into a bank account of the recipient 502, e.g., using ACH, or onto a debit account, e.g., over debit rails, of the recipient 502.

In some embodiments, initiating the money transfer includes sending a confirmation message to a user to obtain financial account information from that user. In such embodiments, the PPS 110 may not have the financial account information of both the sender 501 and the recipient 502. The PPS 110 can send to the user a confirmation message that includes a confirmation link that redirects the user to a page (e.g., a web page or a GUI of an application) that contains a form, e.g., a web form with fields, that the user can submit the financial account information. Once the financial account information is received, the PPS 110 can cause money to be transferred, e.g., by sending a request to an appropriate card issuer, or by processing a card, or by using ACH (as discussed above).

If the sender financial account information cannot be identified, the PPS 110 can send the confirmation message to the sender 501. For example, the PPS 110 sends the confirmation message to the sender 501 by using a sender identifier, e.g., an email address received from the forum system 505. The confirmation message includes a confirmation link that prompts the sender 501 to confirm the intent to transfer money to the recipient 502 (identified based on association with the payment proxy included in the message 503). An example of such a confirmation message is shown in 510. The sender 501 can confirm by engaging with the confirmation link. For example, the confirmation link is a URL link that redirects the sender 501 to a web form with fields that prompts the sender 501 to submit financial account information in order to confirm the money transfer to the recipient 502. In such an example, the sender 501 can engage with the URL link by clicking and entering the financial account information into the web form, e.g., via a touch screen display, a mouse, or any other input/output device of a sender device of the sender 501.

If the recipient financial account information cannot be identified, the PPS 110 can send the confirmation message to the recipient 502. For example, the PPS 110 sends the confirmation message the recipient 502 using a recipient identifier stored in association with the payment proxy, e.g., an email address. The confirmation message includes a confirmation link that prompts the recipient 502 to accept the money transfer from the sender 501 (identified based on a sender identifier associated with the message 503). The recipient 502 can confirm by engaging with the confirmation link. For example, the confirmation link is a URL link that redirects the recipient 502 to a web form with fields that prompts the recipient 502 to submit financial account information in order to confirm the money transfer from the sender 501. In such an example, the recipient 502 can engage with the URL link by clicking and entering the financial account information into the web form, e.g., via a touch screen display, a mouse, or any other input/output device of a sender device of the sender 501.

In some embodiments, the PPS 110 sends a confirmation message to a user simply to obtain a confirmation, even if the financial account of the user has already been identified. In such embodiments, the confirmation message operates as a safety measure to ensure that it is the user that wishes to participate in the money transfer. This can be beneficial, for example, for the sender 501 who may have inadvertently triggered the money transfer, may have entered the incorrect payment proxy (e.g., $calistatepark versus $statepark), and/or may have changed his/her mind and wishes to cancel the money transfer. On the other hand, the recipient 502 may also benefit from receiving a confirmation message, for example, to verify who has sent money and/or to decline the money from the sender 501.

Figure 6:
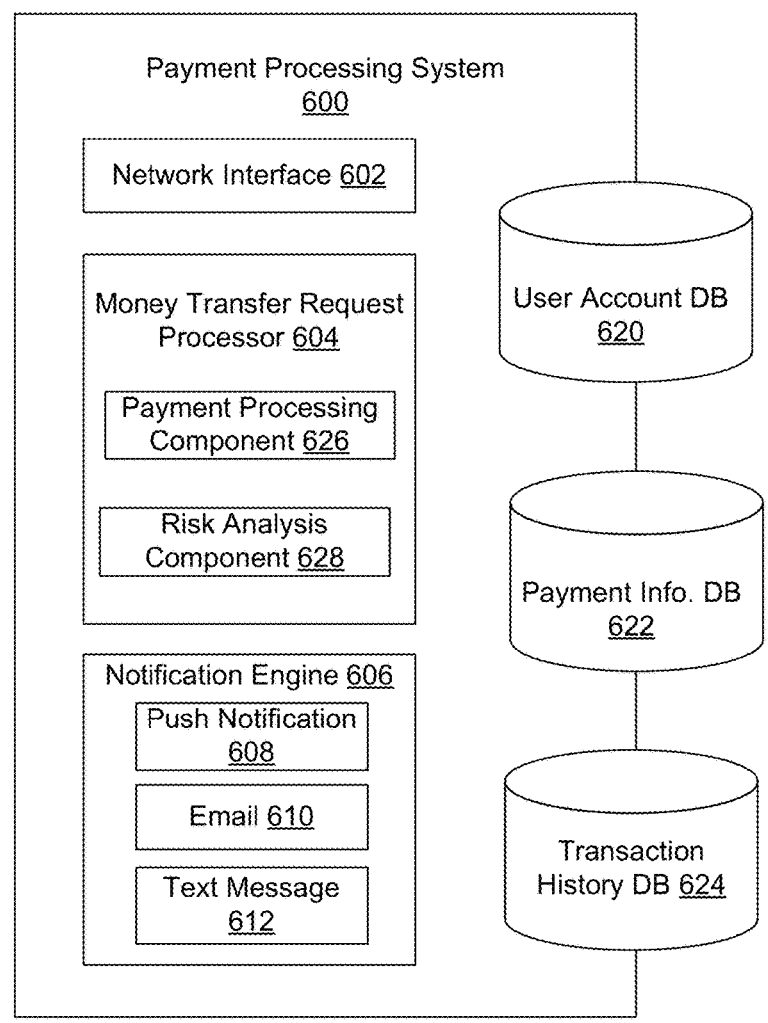
FIG. 6 is a block diagram illustrating various components of a payment processing system executing the offline payment technology, in accordance with some embodiments of the present subject matter.

FIG. 6 is a block diagram illustrating various components of a payment processing system 600 ("PPS 600") executing the offline payment technology, in accordance with some embodiments. In some embodiments, the PPS 600 can be the PPS 110 of FIG. 1. The PPS 600 includes a network interface 602, a money transfer request processor 604, a notification engine 606 ("request engine 606"), a payment processing component 626, and a risk management component 628. In some embodiments, the PPS 600 further includes one or more databases, such as a user account database 620 ("DB 620"), a payment information ('info.') database 622 ("DB 622"), and a transaction history database 624 ("DB 624"). The network interface 602 can be a networking module that enables the PPS 600 to transmit and/or receive data in a network with an entity that is external to the PPS 600 (e.g., a remote server associated with a communication application), through any known and/or convenient communications protocol supported by the PPS 600 and the external entity. The network interface 602 can include one or more of a network adaptor card, a wireless network interface card (e.g., SMS interface, WiFi interface, interfaces for various generations of mobile communication standards including, but not limited to, 1G, 2G, 3G, 3.5G, 4G, LTE, etc.), Bluetooth, Bluetooth Low Energy, a router, an access point, a wireless router, a switch, a multilayer switch, a protocol converter, a gateway, a bridge, bridge router, a hub, a digital media receiver, and/or a repeater.

Each of the DBs 620, 622, and 624 can include, for example, one or more hard drives (which may be further coupled together using RAID-0, 1, 5, 10, etc.), a centralized or distributed data cluster, a cloud-storage service provider, or other suitable storage systems suitable for storing digital data. The DB 622 can store various fields of data, such as user identifiers (IDs) (e.g., email addresses, telephone numbers, usernames, payment proxies associated with the customers and merchants (e.g., $alex), device IDs, etc.), user profile information, shipping address, billing address, risk score associated with a customer or a merchant, where the risk score indicates the likelihood of entering a fraudulent transactions, and/or the like. The DBs may also include an indicator or flag to indicate whether a payment transaction was an offline transaction or an online transaction. In other words, whether the customer device or the POS terminal participating in a payment transaction was offline. The DB 622 can store various fields of data, such as user identifiers associated with payment cards, payment card/account numbers, expiration dates, card/account type, CVVs, billing addresses, and/or the like. The DB 624 can store various fields of data, such as transaction identifiers (IDs), user identifiers (IDs), transaction dates/times, amounts, transaction participant identification information (e.g., email addresses or telephone numbers associated with the senders and recipients of money transfer transactions), and/or the like.

The PPS 600 can access the databases 620, 622, and 624 to retrieve and/or store data for executing the offline payment technology. In particular, the PPS 600 can search the databases 620, 622, 624 for data stored in association with other relevant data needed to process money transfers associated with the offline payment technology. For example, the PPS 600 can store, in any of the databases 620, 622, and/or 624, a newly created payment proxy of a user (e.g., sender user or recipient user) in association with another identifier associated with the user (e.g., telephone number, email address, instant message username, etc.). In this example, the PPS 600 can create the unique payment proxy in response to, for example, the user registering for a money transfer service via the tagging mechanism, which is provided by the PPS 600. As used here, the term "tagging" refers to a marking of an alphanumeric character (or a string of alphanumeric characters) to identify it (i.e., the character or string) for treatment in a specified way. The term "alphanumeric character" as used here refers to a symbol that can be a number (i.e., numeric), a letter (i.e., alphabetic), or a combination thereof. Briefly described, the tagging technology enables a sender, who desires to send cash to a recipient, to trigger a money transfer by specifying, in any communication message, an amount and a recipient using one or more inputs having a particular syntax. The syntax includes a monetary currency indicator (or "currency indicator") prefixing one or more alphanumeric characters. The currency indicator operates as the tagging mechanism that indicates to a computer system to treat the inputs as a request from the sender to transfer cash, where detection of the syntax (which includes one or more alphanumeric characters tagged by a monetary currency indicator) triggers a transfer of cash. The currency indicator can correspond to various currencies, e.g., dollar ($), euro (€), pound (£), yuan (¥), etc. Although use of the dollar currency indicator ($) is used herein, it is to be understood that any currency symbol could equally be used.

The registration can include, for example, the user submitting payment card information for the PPS 600 to process the money transfer service. In another example, the PPS 600 can search and retrieve, from the databases 620, 622, and/or 624, a user's email address that is stored in association with the user's payment proxy. In some embodiments, the data stored in the DBs 620, 622, and 624 can be utilized for determining intent of a sender to transfer money. For example, data about past transactions can help the PPS 600 determine the context of a message composed by a sender, and utilize such context to predict the intent to transfer money.

The money transfer request processor 604 ("processor 604") can process money transfer requests associated with the offline payment technology as described in detail throughout the specification, for example, at least with respect to FIGS. 1-10. For example, the processor 604, through the payment processing component 626 and the risk management component 628, can receive a money transfer request from a communication application (and/or a server computer system associated with the communication application), parse the money transfer request to extract details such as identification information that identifies a money sender (e.g., telephone number), identification information that identifies a money recipient (e.g., a payment proxy), the amount, and the like.

In some cases, the payment processing system 600 receives a number of requests from the merchant and the customer after each of the customer device and the merchant device transitions into the online mode. The payment processing system 600, using the payment processing component 626, selects one request for processing for example based on factors, such as risk score, the order of time in which the request was received, merchant or customer preference, cost of transfer, efficiency, power levels, signal strength between the online device and the payment service, transaction history, customer data, and/or customer history, and the like.

The processor 604 can check, based on the identification information associated with the money sender and the money recipient, respectively, whether the respective identification information are associated with one or more payment cards of the money sender and recipient, respectively. For example, the processor 604 accesses the DBs 620, 622, and/or 624 to determine whether the money sender's telephone number is associated with payment card data that identifies the money sender's payment card. In another example, the processor 604 accesses the DBs 620, 622, and/or 624 to determine whether the payment proxy of the money recipient is associated with payment card data that identifies the money recipient's payment card. The processor 604 can then initiate a transfer of an amount associated with the money transfer request from, e.g., a bank account funding the money sender's payment card to a bank account associated with the money recipient's payment card. The processor 604 can also check whether the payment proxy has been associated with fraudulent transactions and is therefore, risky. Accordingly, the processor 604 may notify the merchant of such risks associated with the transaction.

In some embodiments, users (e.g., the money sender and the money recipient) can have mobile applications installed on their mobile devices. In such embodiments, the money transfer requests associated with those users can cause the notification engine 606 to generate and send push notifications using a push notification module 608. In some embodiments, a push notification for a money transfer request may be generated based on information included in the money transfer request, and can prompt the user to confirm or cancel the money transfer request. For example, a push notification can be a message that prompts a sender user to confirm she wants to send money to a recipient (i.e., confirm her intent to send money when she has submitted an input with a specified syntax). In some embodiments, the push notification can prompt the user to provide payment card information associated with a payment card of the user to process the money transfer request. Based on the user's response, the PPS 600 can process the money transfer request by initiating transfer of an amount of funds corresponding to the money transfer request.

In some embodiments, the notification engine 606 can include an email notification component 610 to generate and send email notifications. In such embodiments, the notification engine 606 is able to communicate with users who may not have the mobile application installed on their mobile devices and/or may not have mobile devices. An email notification generated by the email notification component 610 can be in the form of an electronic mail, or email message, that prompts a user to confirm or cancel a money transfer request. In some embodiments, the email message can prompt the user to provide payment card information associated with a payment card of the user to process the money transfer request.

In some embodiments, the notification engine 606 can include a text notification component 612 to generate and send text message notifications. In such embodiments, the notification engine 606 is able to communicate with users who may not have the mobile application installed on their mobile devices. A text message notification generated by the text notification component 612 can be in the form of a text message that prompts a user (e.g., a money sender user) to confirm or cancel a money transfer request. In some embodiments, the text message can prompt the user to provide payment card information associated with a payment card of the user to process the money transfer request.

Note the notification engine 606 and its associated modules can be utilized to communicate with recipient users, in addition to sender users. For example, the email notification component 610 can generate an email message to obtain payment card information from a recipient user. In another example, the push notification module 608 can generate a push notification to obtain payment card information from the recipient user. In yet another example, the text notification component 612 can generate a text message to obtain payment card information from the recipient user.

FIG. 7 illustrates example database tables coupled to the PPS 110 or PPS 800 in accordance with some embodiments of the offline payment technology. In some embodiments, the PPS 110 can utilize the data stored in the databases 702, 704, and/or 706 to process payment transactions (e.g., money transfers) on behalf of customers or merchant aka users of the payment service employing the PPS 110. For example, the PPS 110 can utilize the data in the database tables 702, 704, 706 as an index of all customer users who have user accounts and/or payment proxies registered with the PPS 110.

As illustrated, FIG. 7 illustrates example fields of a database table 702, a database table 704, and a database table 706. The database table 702 can include various fields of information such as, but are not limited to, user1 ID1 (e.g., payment proxy), user1 ID2 (e.g., email address), user1 ID3 (e.g., risk score or health rating as a value or relative measure), first name, last name, billing address, and/or the like. The database table 704 can include various fields of information such as, but are not limited to, user ID1, card identifier (e.g., card account number), issuer, expiration date, billing address, and/or the like. In some embodiments, the user1 ID1 can be replaced with other user identifiers, or IDs, associated with the same customer, e.g., user1 ID2 and user1 ID3. The database table 706 can include various fields of information such as, but are not limited to, transaction date, transaction ID, user1 ID1 (e.g., a customer, such as a recipient user), user2 ID1 (e.g., a merchant such as a sender user), a nature of transaction (e.g., offline or online payment transaction, labeled offline when at least one of the participating devices was offline), a transaction amount (e.g., money transfer payment amount), and/or the like.

Figure 8:
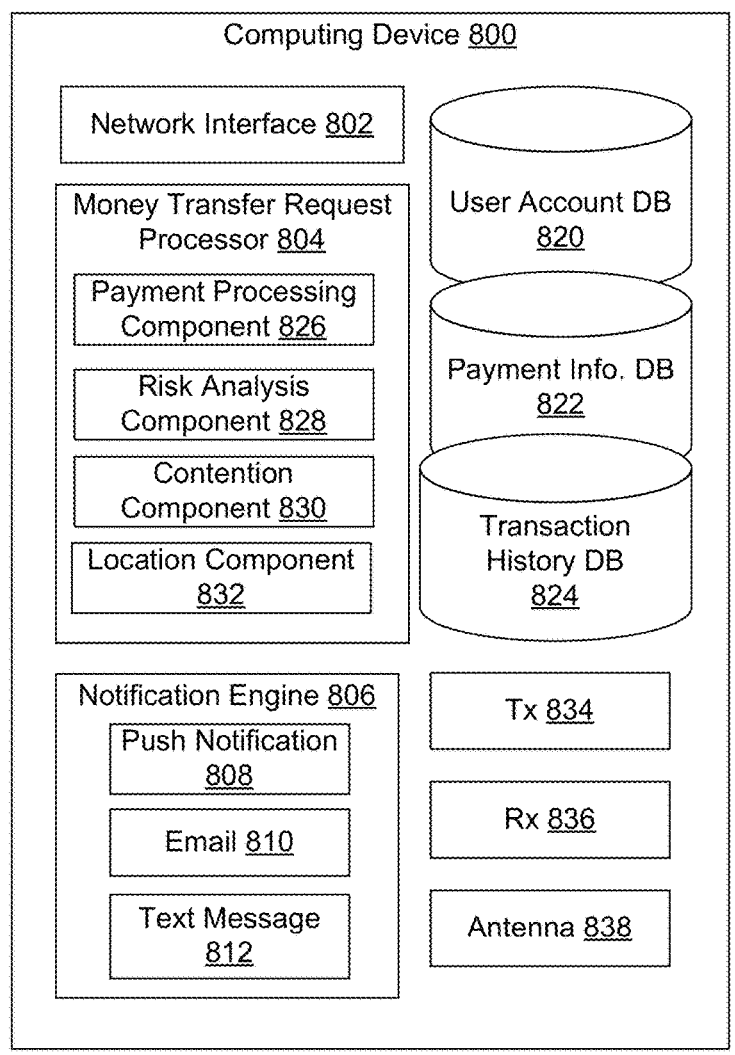
FIG. 8 is a block diagram illustrating various components of a customer device or a POS terminal executing the offline payment technology, in accordance with some embodiments of the present subject matter.

FIG. 8 is a block diagram illustrating various components of a customer device or a POS terminal ("computing device 800") executing the offline payment technology, in accordance with some embodiments. In some embodiments, the computing device 800 can be the customer device 107 or the POS terminal 104 of FIG. 1. The computing device 800 includes a network interface 802, a money transfer request processor 804, a notification engine 806 ("request engine 806"), a payment processing component 826, a risk management component 828, a component 830, and a location component 832. In one implementation, the location component 832 detects a specific device from amongst devices available in its neighborhood or communication distance range based on the protocol on which the customer device is operating. The location component 832 thus determines a geographical location associated with the customer device, and the identifies a set of prospective neighboring devices in proximity to the customer based on the geographical location of the customer devices. The location component 832 then generates, for display at the customer device, a list of neighboring devices to enable the customer to select a device for the transfer of funds. On receiving a selection of the POS terminal from amongst the list, the customer device establishes, through the transmitter 834, received 836 or antenna 838 of the customer device and based on the short-range communication network protocol, a communication channel with a respective network interface of the POS terminal.

The payment processing component 826 receives the payment request having information regarding a transaction and the payment proxy of the customer and/or the merchant from the secondary device (e.g., the offline device) and attempts to authorize the payment proxy to conduct the transaction. The payment processing component 826 may store the received transaction information. In some cases, the payment processing component 826 may then send an indication of whether the payment proxy has been approved or declined back to the user device. The payment processing component 826 can identify the merchant or the customer based on the payment proxy (if one is included) or based on another identifier of a recipient, e.g., the merchant or the customer (e.g., email address, username, phone number, etc.). The payment processing component 826 can further identify a recipient financial account of the recipient by mapping the recipient's identifier to the financial account using association data stored in a database.

In some embodiments, the computing device 800 further includes one or more databases, such as a user account database 820 ("DB 820"), a payment card database 822 ("DB 822"), and a transaction history database 824 ("DB 824"). The network interface 802 can be a networking component (e.g., BLE, Bluetooth, Wi-Fi, NFC, EMV interface) that enables the computing device 800 to transmit and/or receive data in a network with an entity that is external to the computing device 800 (e.g., a remote server associated with a communication application), through any known and/or convenient communications protocol supported by the computing device 800 and the external entity. The network interface 802 can include one or more of a network adaptor card, a wireless network interface card (e.g., SMS interface, Wi-Fi interface, interfaces for various generations of mobile communication standards including, but not limited to, 1G, 2G, 3G, 3.5G, 4G, LTE, etc.), Bluetooth, Bluetooth Low Energy, a router, an access point, a wireless router, a switch, a multilayer switch, a protocol converter, a gateway, a bridge, bridge router, a hub, a digital media receiver, and/or a repeater. To this end, the computing device 800 includes a transmitter 834, a receiver 836, and an antenna 838 (which can be combined into a single transceiver unit).

Each of the DBs 820, 822, and 824 can include, for example, one or more hard drives (which may be further coupled together using RAID-0, 1, 5, 10, etc.), a centralized or distributed data cluster, a cloud-storage service provider, or other suitable storage systems suitable for storing digital data. The DB 822 can store various fields of data, such as user identifiers (IDs) (e.g., email addresses, telephone numbers, usernames, payment proxies associated with the customers and merchants (e.g., $alex), device IDs, etc.), user profile information, shipping address, billing address, risk score associated with a customer or a merchant, where the risk score indicates the likelihood of entering a fraudulent transactions, and/or the like. The DBs may also include an indicator or flag to indicate whether a payment transaction was an offline transaction or an online transaction. In other words, whether the customer device or the POS terminal participating in a payment transaction was offline. The DB 822 can store various fields of data, such as user identifiers associated with payment cards, payment card/account numbers, expiration dates, card/account type, CVVs, billing addresses, and/or the like. The DB 824 can store various fields of data, such as transaction identifiers (IDs), user identifiers (IDs), transaction dates/times, amounts, transaction participant identification information (e.g., email addresses or telephone numbers associated with the senders and recipients of money transfer transactions), and/or the like.

The computing device 800 can access the databases 820, 822, and 824 to retrieve and/or store data for executing the offline payment technology. In particular, the PPS 800 can search the databases 820, 822, 824 for data stored in association with other relevant data needed to process money transfers associated with the offline payment technology. For example, the computing device 800 can store, in any of the databases 820, 822, and/or 824, a newly created payment proxy of a user (e.g., sender user or recipient user) in association with another identifier associated with the user (e.g., telephone number, email address, instant message username, etc.). In this example, the computing device 800 can create the unique cash ID in response to, for example, the user registering for a money transfer service via the tagging mechanism, which is provided by the computing device 800 The registration can include, for example, the user submitting payment card information for the computing device 800 to process the money transfer service. In another example, the computing device 800 can search and retrieve, from the databases 820, 822, and/or 824, a user's email address that is stored in association with the user's unique cash ID. In some embodiments, the data stored in the DBs 820, 822, and 824 can be utilized for determining intent of a sender to transfer money. For example, data about past transactions can help the computing device 800 determine the context of a message composed by a sender, and utilize such context to predict the intent to transfer money, unless the intent is specified through a custom application, message or language.

The money transfer request processor 804 ("processor 804") can process money transfer requests associated with the offline payment technology as described in detail throughout the specification, for example, at least with respect to FIGS. 1-10. For example, the processor 804, through the payment processing component 828 and the risk analysis component 828, can receive a money transfer request from a communication application (and/or a server computer system associated with the communication application), parse the money transfer request to extract details such as identification information that identifies a money sender (e.g., telephone number), identification information that identifies a money recipient (e.g., a payment proxy), the amount, and the like.

The processor 804 can check whether the payment proxy has been associated with fraudulent transactions and is therefore, risky. For example, the risk analysis component 828 includes risk scores, based on identifiers associated with stolen payment objects and/or information regarding known nefarious users (i.e., customers or merchants known to have previous unsuccessful transactions, charge backs, etc.). Accordingly, the processor 804 may notify the user of such risks associated with the transaction.

The processor 804 can also determine, based on the identification information associated with the money sender and the money recipient, respectively, whether the respective identification information are associated with one or more payment cards of the money sender and recipient, respectively. For example, the processor 804 accesses the DBs 820, 822, and/or 824 to determine whether the money sender's telephone number is associated with payment card that identifies the money sender's payment proxy. In another example, the processor 804 accesses the DBs 820, 822, and/or 824 to determine whether the payment proxy of the money recipient is associated with payment card data that identifies the money recipient's payment proxy. The processor 804 can then initiate a transfer of an amount associated with the money transfer request from, e.g., a bank account funding the money sender's payment card to a bank account associated with the money recipient's payment card.

In some embodiments, users (e.g., the money sender and the money recipient) can have mobile applications installed on their mobile devices. In such embodiments, the money transfer requests associated with those users can cause the notification engine 806 to generate and send push notifications using a push notification module 808. In some embodiments, a push notification for a money transfer request may be generated based on information included in the money transfer request, and can prompt the user to confirm or cancel the money transfer request. For example, a push notification can be a message that prompts a sender user to confirm she wants to send money to a recipient (i.e., confirm her intent to send money when she has submitted an input with a specified syntax). In some embodiments, the push notification can prompt the user to provide payment card information associated with a payment card of the user to process the money transfer request. Based on the user's response, the computing device 800 can process the money transfer request by initiating transfer of an amount of funds corresponding to the money transfer request.

In some embodiments, the notification engine 806 can include an email notification component 810 to generate and send email notifications. In such embodiments, the notification engine 806 is able to communicate with users who may not have the mobile application installed on their mobile devices and/or may not have mobile devices. An email notification generated by the email notification component 810 can be in the form of an electronic mail, or email message, that prompts a user to confirm or cancel a money transfer request. In some embodiments, the email message can prompt the user to provide payment card information associated with a payment card of the user to process the money transfer request.

In some embodiments, the notification engine 806 can include a text notification component 812 to generate and send text message notifications. In such embodiments, the notification engine 806 is able to communicate with users who may not have the mobile application installed on their mobile devices. A text message notification generated by the text notification component 812 can be in the form of a text message that prompts a user (e.g., a money sender user) to confirm or cancel a money transfer request. In some embodiments, the text message can prompt the user to provide payment card information associated with a payment card of the user to process the money transfer request.

Note the notification engine 806 and its associated modules can be utilized to communicate with recipient users, in addition to sender users. For example, the email notification component 810 can generate an email message to obtain payment card information from a recipient user. In another example, the push notification module 808 can generate a push notification to obtain payment card information from the recipient user. In yet another example, the text notification component 812 can generate a text message to obtain payment card information from the recipient user.

Figure 9:
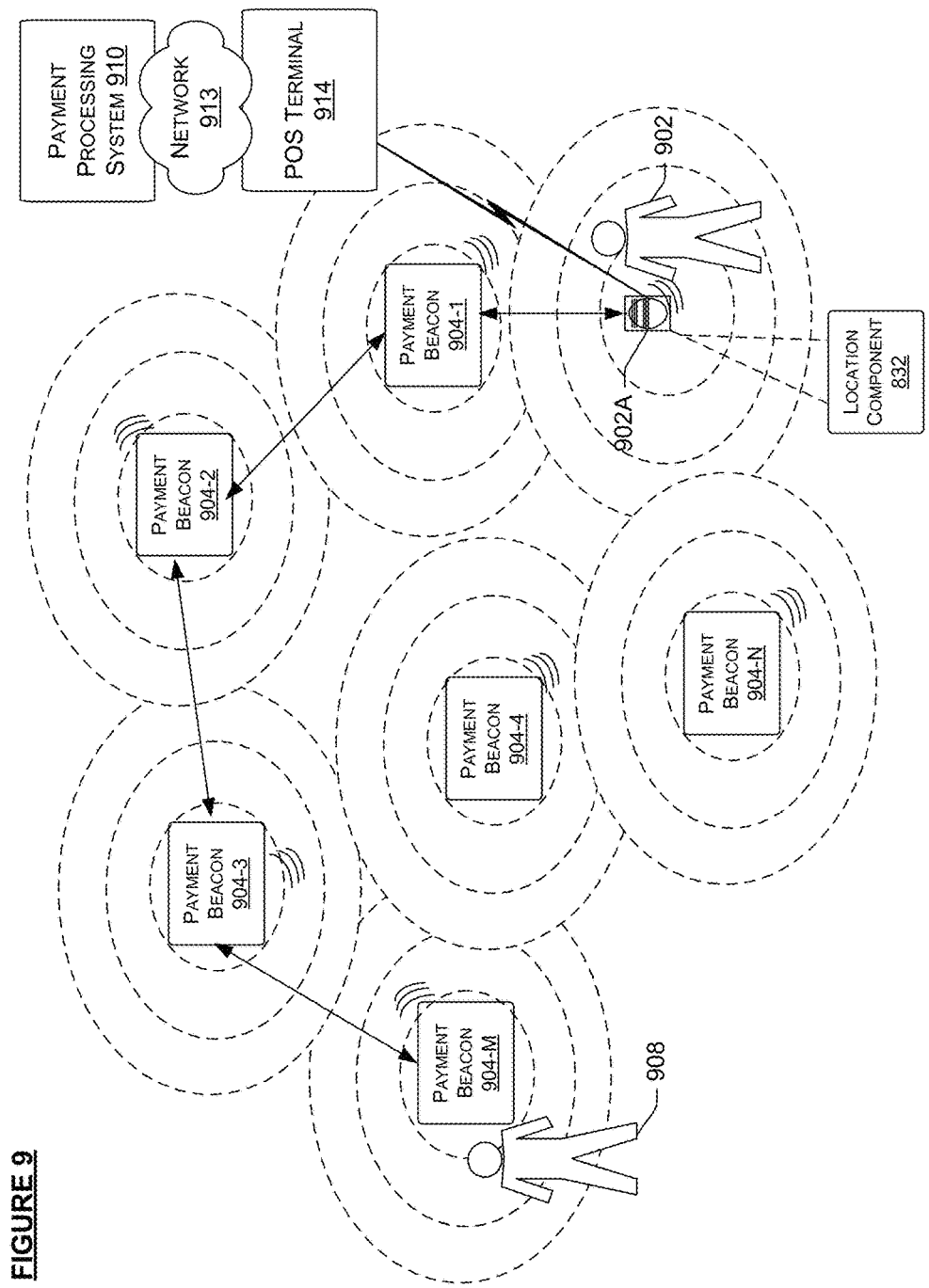
FIG. 9 is an exemplary scenario where a number of beacons interact with each other to transmit information to a requesting customer device through an ad-hoc or static mesh network, according to an implementation of the present subject matter.

FIG. 9 is an exemplary scenario where a number of beacons interact with each other to transmit information to a requesting customer device through an ad-hoc or fixed mesh network, according to an implementation of the present subject matter. As shown, a customer 902 with access to a customer device 902A interacts with a payment beacon 904-1 in its vicinity. For example, a customer purchases or requests a product and/or service at a remote point-of-sale terminal 914 or through a payment reader or beacon connected thereto. The POS terminal 914 is assumed to be offline in this scenario, for ease of understanding. Consider a parking garage or a state park where the customer requests for initiation of a parking session by tapping or otherwise interacting with the payment beacon (hereinafter referred to "neighboring beacon.") In other embodiments, the payment beacon 904-1 activates on detecting, through sensor arrangement, a parked car at a parking location. In cases where the neighboring payment beacon 904-1 is not associated with the merchant, the neighboring payment beacon can establish a mesh network 906 with a remote payment beacon 904-M (assuming there are N payment beacons from 904-1, . . . 904-M, . . . 904-N) associated with the merchant 908 through several payment beacons in between the neighboring beacon and the remote beacon 904-M. The superimposing dotted circles indicate which beacons can communicate with each other. To use a neighboring beacon 904-1 for purposes of data acquisition from a remote beacon 904-M, the customer uses a user interface on the customer device or the beacon 904-1 and makes such an indication. The neighboring beacon 904-1 discovers paths from the neighboring beacon 904-1 to the desired remote beacon 904-M. In one implementation, the path passes through several beacons, e.g., through 904-2 and 904-3. The neighboring beacon 904-1 may choose a path of least "hops" and establishes a communication channel between the remote beacon and the neighboring beacon, or the customer device. In this case, the neighboring beacon 904-1 connects the customer 902 and his device 902A with the beacon 904-M through beacon 902-2. The beacon 904-M (of the merchant) sends its payment proxy, and other information, such as transaction summary, through the established "routing path" (shown by arrows). The customer device 902A (that is online with respect to the payment processing system 910) uses the payment proxy of the merchant to submit a payment request for a product or service to a payment processing system 910 through the network 913, on behalf of the merchant 908 or the POS terminal 914 that is offline.

The term "hop" refers to the number of beacons or devices the routing path includes before the customer device and the desired remote beacon are connected. Accordingly, the routing path, i.e., the communication channel between the customer device 902A and a remote beacon 904-M can be a one-hop routing path or a multi-hop routing path based on whether there is one or several intermediate beacons between the customer device 902A, respectively.

While one-hop routing paths can be used, they suffer from problems such as low coverage area and being overloaded. One solution to this is the use of wireless mesh networks ("WMN"). Mesh networking is a way to route data, voice, video, and instructions between beacons (or nodes) of the network separated by several beacons. It allows for continuous connections and reconfiguration around broken or blocked paths by "hopping" from beacon to beacon until the destination is reached. Mesh networks differ from other networks in that the component parts can all connect to each other via multiple hops, and they generally are not mobile. Thus each beacon in a mesh network can communicate with other nodes in its immediate neighborhood. Thus, a routing path can be a wireless co-operative communication infrastructure between a massive amounts of individual wireless transceivers (i.e. a wireless mesh) that have Ethernet-type capabilities.

This type of infrastructure is decentralized (with no central server) providing a relatively inexpensive, very reliable, and resilient system as each beacon need only transmit as far as the next node. Beacons thus act as repeaters to transmit data from nearby beacons to peers that would otherwise be too far away to reach, resulting in a network that can span large distances without wired cable in between, especially over rough or difficult terrain. Mesh networks are also extremely reliable, as each beacon is connected to several other beacons. When one beacon drops out of the network, due to hardware failure or any other reason, its neighbors simply find another routing path. Extra capacity can be installed by simply adding more beacons.

Mesh networking operates on a principle similar to the way packets travel around the wired Internet—data hops from one device to another until it reaches a given destination. Dynamic routing capabilities included in each device within the network allow this to happen. To implement such dynamic routing capabilities, each device needs to communicate its routing information to every device it connects with, "almost in real time". Each device then determines what to do with the data it receives, either pass it on to the next device or keep it. Each beacon within the network must have a unique identity called a network address to facilitate peer-to-peer communication among the nodes. Due to the irregular and spontaneous nature of IP mesh network topology the address assignment becomes a non-trivial issue. To address this issue each mesh point in an 802.11 mesh networks use a MAC address allocated by the manufacture of the device. The Institute of Electrical and Electronic Engineers ("IEEE") 802.11 standard identifies services that must be provided by a distribution system. A distribution system, be it wireless or wired, is the fundamental part of a network as it is the mechanism by which one access point communicates with another to exchange frames, forward frames to follow mobile stations from one location to another, and to exchange frames with wired networks.

In some implementations, ad-hoc routing algorithms can be used for example, Ad-Hoc Mesh Routing (AHMR), Ad-hoc On-Demand Distance Vector Routing (AODV), Destination-Sequenced Distance Vector protocol (DSDV), Temporally-Ordered Routing Algorithm (TORA), Associativity Based Routing (ABR) and Dynamic Source Routing (DSR). The assumption is that the destination node (e.g., merchant beacon or POS terminal 914) is one or multiple hops or access points away from the source node (e.g., customer device). The source node hops over intermediate node(s) to reach the destination node. Each of the devices have access to a routing table which is either stored locally or on an external server. The routing table includes the routing information to all the destination nodes in the wireless local area mesh network. The data packets are forwarded from the source node to the destination node by the intermediate nodes based on the routing tables along the path. To maintain the valid routes and to avoid the routing loops due to the link/node failure and network topology changes, each node periodically transmits route updates and/or broadcasts the updates immediately when significant new information is available.

Figure 10:
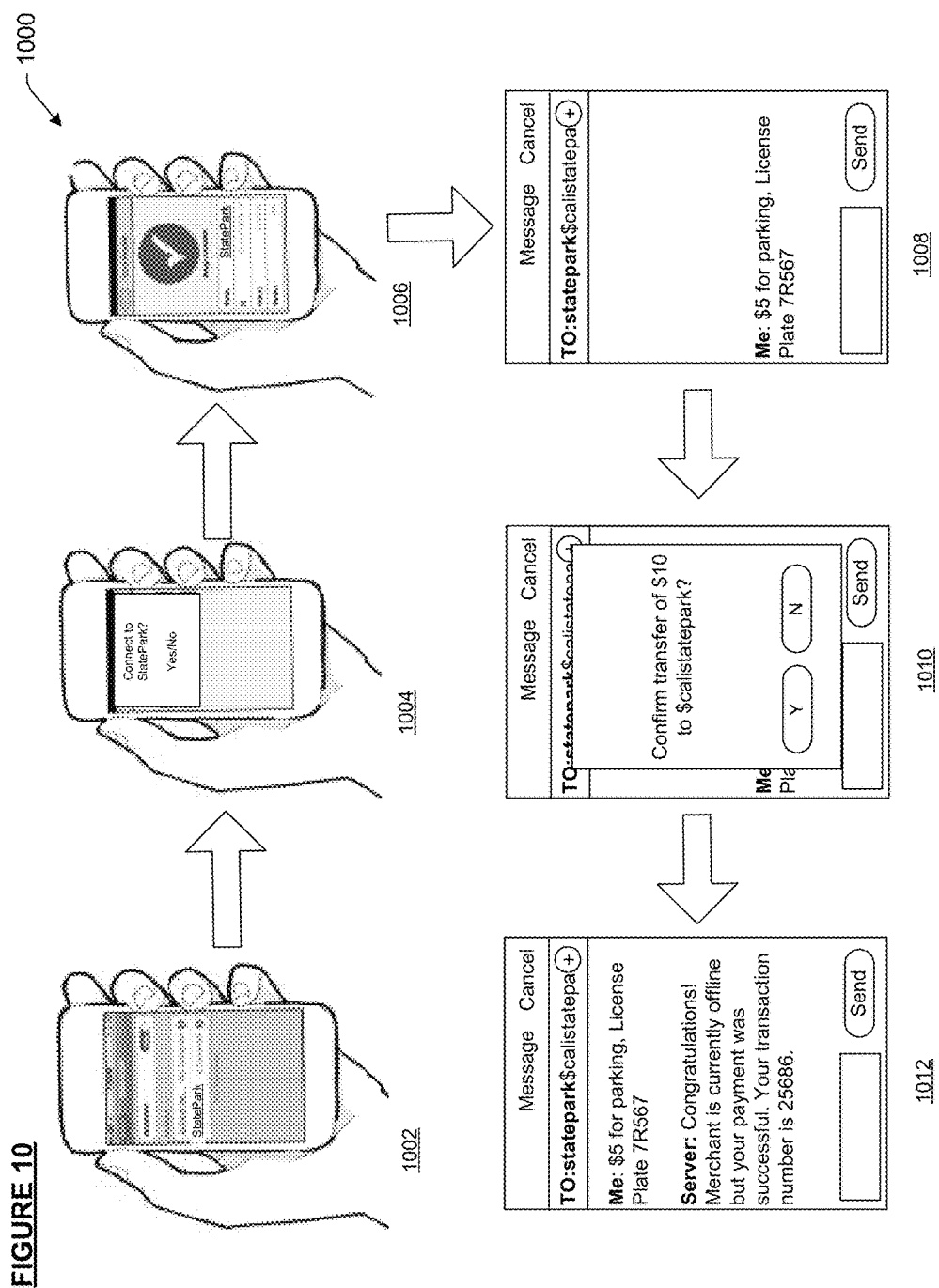
FIG. 10 illustrates a data flow method using example user interfaces, being presented on the computing device for exchanging of payment information with a companion device, particularly in an offline-online context, according to an embodiment of the present subject matter.

FIG. 10 illustrates a data flow method 1000 using example user interfaces, being presented on the computing device (POS terminal 104 or the customer device 107), for exchanging of payment information with a companion device (the customer device 107 or the POS terminal 104, respectively), particularly in an offline-online context, according to an embodiment of the present subject matter. For ease in understanding, assume that the customer device 107 is online or primary device, and therefore receiver of payment proxy, and the POS terminal 104 is offline or secondary device, and therefore transmitter of its payment proxy to the customer device 107. The user interfaces 1002-1012, in one example scenario, are in sequence. However, other sequences are possible.

The user interfaces 1000-1012 may allow for the display, execution, interaction, manipulation, and/or operation of program components and/or system facilities through textual and/or graphical facilities through one or more interaction interface elements, such as check boxes, cursors, menus, scrollers, and windows (collectively and commonly referred to as widgets) to facilitate the access, capabilities, operation, and display of data and computer hardware and operating system resources, and status. The user interfaces 1000-1012 may be used to provide a baseline and means of accessing and displaying information graphically to users. The user interface may also be a graphic user interface as provided by, with, and/or atop operating systems and/or operating environments such as discussed herein.

In various embodiments, the user interface is relayed on an audio or video display with a touch screen and driver, the touch screen being based upon a variety of later-developed or current touch screen technology including resistive displays, capacitive displays, optical sensor displays, electromagnetic resonance, or the like. Additionally, touch screen display may include single touch or multiple-touch sensing capability. Any display technology may be used for the output display, such as a Liquid Crystal Display (LCD) or solid state device such as light-emitting diode (LED) or organic light-emitting diode (OLED), Plasma display, trans-reflective (Pixel Qi) display, electronic ink display (e.g. electrophoretic, electrowetting, interferometric modulating). In various embodiments, the resolution of such displays and the resolution of such touch sensors may be set based upon engineering or non-engineering factors (e.g. sales, marketing). In some embodiments, speakers and LED indicators can be used to present audio and visual identifiers of transaction and device status.

The user interface 1002 of the customer device 107 presents the user with options of available companion or neighboring devices in a geographical area around the customer device 107, including POS terminal 104. The customer 106 selects the name of the POS terminal 104 as displayed on the interface, which initiates the process of pairing of the two devices. If the name does not show up on the list, the customer 106 can request the merchant 102 to activate the wireless transceiver of the POS terminal 104. In another implementation, the customer device 107 may not need to be paired as long as the neighboring devices are publically transmitting their payment proxies, and as such the next user interface is 1008 or 1010.

The user interface 1004 of the customer device 107 presents the user with an option to confirm whether the name displayed on the user interface matches the name for the POS terminal 104. Once confirmed, another interface may request the customer 106 to enter a password associated with the POS terminal 104.

The user interface 1006 of the customer device 107 presents the user information confirming pairing of the customer device 107 with the POS terminal 104. Depending on the implementation, the information can include a graphic 1217 indicating a successful pairing, an identification number for the POS terminal 104, a connection status (e.g., "connected") of the POS terminal 104, and the remaining battery life of the POS terminal 104.

The user interface 1008 of the customer device 107 presents the user a message containing a payment proxy from the POS terminal 104. When the customer 106 selects the received payment proxy, another web application, forum, a social-networking website, email application, a messaging application, or a third-party application opens up, with pre-filled payment proxy in the "To" field. In another implementation and as shown in the figure, the customer 106 can open an application of his choice and enter the payment proxy by himself. In yet another implementation, the customer 106 opens the application and searches for paired devices transmitting their payment proxies (e.g., through a drop down menu) and selects the desired companion device and/or payment proxy. Optionally, the customer 106 enters a money transfer amount, unless it is automatically filled in the body of the message.

The user interface 1010 of the customer device 107 presents a notification requesting the customer 106 to confirm the payment on behalf of the merchant 102. At this time, the customer device 107 can also obtain a risk rating or health score from the POS terminal 104 (through appropriate authorization from the merchant 102) or through a local database. The health score may be based on various factors, e.g., past transactions with the customer 106, neighboring customers or all the customers. If the customer 106 is satisfied with the risk rating, the customer 106 confirms the transaction.

The user interface 1012 of the customer device 107 presents the user information confirming successful processing of transaction. Depending on the implementation, the information can also include a receipt showing summary of transactions, an indication that the POS terminal 104 was offline at the time of transaction, and time of transaction.

Regarding the processes 200, 400, 500, and 1000, while the various steps, blocks or sub-processes are presented in a given order, alternative embodiments can perform routines having steps, or employ systems having steps, blocks or sub-processes, in a different order, and some steps, sub-processes or blocks can be deleted, moved, added, subdivided, combined, and/or modified to provide alternative or sub-combinations. Each of these steps, blocks or sub-processes can be implemented in a variety of different ways. Also, while steps, sub-processes or blocks are at times shown as being performed in series, some steps, sub-processes or blocks can instead be performed in parallel, or can be performed at different times as will be recognized by a person of ordinary skill in the art. Further, any specific numbers noted herein are only examples; alternative implementations can employ differing values or ranges. Unless contrary to physical possibility, it is envisioned that (i) the methods/steps described above may be performed in any sequence and/or in any combination, and that (ii) the components of respective embodiments may be combined in any manner. Note that any and all of the embodiments described above can be combined with each other, except to the extent that it may be stated otherwise above or to the extent that any such embodiments might be mutually exclusive in function and/or structure.

While aspects of the described subject matter can be implemented in any number of different systems, circuitries, environments, and/or configurations, the embodiments are described in the context of the following exemplary system(s) and configuration(s). The descriptions and details of well-known components are omitted for simplicity of the description. It will thus be appreciated that those skilled in the art will be able to devise various arrangements that, although not explicitly described or shown herein, embody the principles of the present subject matter. Furthermore, all examples recited herein are intended to be for illustrative purposes only to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

Certain embodiments may be configured for use in stand-alone devices (e.g., PDAs, smartphones, laptops, PCs and/or the like). Other embodiments may be adapted for use in a first device (e.g., mobile phone, and/or the like), which may be connected to a second device (e.g., tablet computer and/or the like) via any type of connection (e.g., Bluetooth, USB, Wi-Fi, serial, parallel, RF, infrared, optical and/or the like) to exchange various types of data (e.g., raw signals, processed data, recorded data/signals and/or the like). In such embodiments, all or part of the data processing may happen on the first device, in other embodiments all or part of the data processing may happen on the second device. In some embodiments there maybe more than two devices connected and performing different functions and the connection between devices and processing may happen in stages at different times on different devices. Certain embodiments may be configured to work with various types of processors (e.g., ARM, Raspberry Pi and/or the like). Furthermore, such embodiments are configured to operate on a variety of mobile devices, web applications, mobile applications, POS topologies, payment cards, computer networks, and environments.

It should also be appreciated by those skilled in the art that any block diagrams, steps, or sub-processes herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown. The order in which the methods are described are not intended to be construed as a limitation, and any number of the described method blocks can be deleted, moved, added, subdivided, combined, and/or modified in any order to implement the methods, or an alternative combination or sub-combinations. Also, while steps, sub-processes or blocks are at times shown as being performed in series, some steps, sub-processes or blocks can instead be performed in parallel, or can be performed at different times as will be recognized by a person of ordinary skill in the art. Further any specific numbers noted herein are only examples; alternative implementations can employ differing values or ranges. Furthermore, the methods can be implemented in any suitable hardware, software, firmware, or combination thereof.

The above description provides specific details for a thorough understanding and enabling description of these embodiments. One skilled in the relevant art will understand, however, that the embodiments discussed herein may be practiced without many of these details. Likewise, one skilled in the relevant art will also understand that the embodiments can include many other features not described in detail herein. Additionally, some well-known structures or functions may not be shown or described in detail below, so as to avoid unnecessarily obscuring the relevant description. Some of the recurring terms are now defined.

Reference to an "embodiment" or "implementation" in this document does not limit the described elements to a single embodiment; all described elements may be combined in any embodiment in any number of ways. Furthermore, for the purposes of interpreting this specification, the use of "or" herein means "and/or" unless stated otherwise. The use of "a" or "an" herein means "one or more" unless stated otherwise. The use of "comprise," "comprises," "comprising," "include," "includes," and "including" are interchangeable and not intended to be limiting. Also, unless otherwise stated, the use of the terms such as "first," "second," "third," "upper," "lower," and the like do not denote any spatial, sequential, or hierarchical order or importance, but are used to distinguish one element from another. It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Additionally, note that the terms "connected" or "coupled" and related terms used throughout the description are used in an operational sense and are not necessarily limited to a direct physical connection or coupling. Thus, for example, two devices may be coupled directly, or via one or more intermediary media or devices. As another example, devices may be coupled in such a way that information can be passed there-between, while not sharing any physical connection with one another. Based on the disclosure provided herein, one of ordinary skill in the art will appreciate a variety of ways in which connection or coupling exists in accordance with the aforementioned definition. Further, in some embodiments, one entity, component or device is said to establish connection with another, but it will be understood that the identity of which party initiates connection can be switched around, and therefore, the other device can establish connection with the first in a similar wat. For example, the disclosure includes the embodiments where device A is said to establish connection with device B through BLE; similarly, device B can establish connection with device A through BLE, and a third device(s) or server(s) can also establish connection between device A and device B through BLE.

The term "communication network" may be any type of network known in the art, such as a local area network or a wide area network, such as the Internet, and may include a wireless network, such as a cellular network, a cloud network, a local wireless network, such as Wi-Fi and/or close-range wireless communications, such as Bluetooth and Bluetooth low energy, near field communications (NFC), a wired network, or any other such network, or any combination thereof. Accordingly, the network may include both wired and/or wireless communication technologies, including Bluetooth, Bluetooth low energy, Wi-Fi and cellular communication technologies like worldwide interoperability for microwave access (Wi-MAX), 3G, 4G, CDMA, digital subscriber line (DSL), etc., cloud computing technologies, as well as wired or fiber optic technologies. Additionally or alternatively, the communication network may be a mesh network. For example, in a wireless local area network (WLAN), network devices may be configured to receive and forward communications, which are ultimately destined for a different device. These types of networks are generically referred to as "mesh" networks, where network nodes may form a "mesh" of paths for which communications may travel to reach their destination. Wireless networks may use beacon transmissions to advertise the network's existence, as well as provide information about the network and capabilities associated with the network. Different kinds of beaconing mechanisms may be used, for example, one for infrastructure mode networks (also called basic service set (BSS) networks) and one for ad-hoc mode networks (also called independent basic service set (IBSS) networks). In infrastructure networks, access points (APs) are the entities responsible for generating beacons whereas in ad hoc networks, all network nodes (including user stations) participate in the generation of beacons. The ad hoc network beacons (referred to as IBSS beacons) are used to advertise the network (which consists of all the nodes) as a whole while the infrastructure network beacons (referred to as BSS beacons) are generated by an AP and meant to advertise the existence of only that individual AP. Components used for such communications can depend at least in part upon the type of network, the environment selected, or both. Protocols for communicating over such networks are well known and are not discussed herein in detail.

The term "beacons" refer to devices that use direct radio signal communication to directly communicate information wirelessly to other devices using mid-range to short-range radio signal protocols. In other words, the wireless beacons can directly communicate using radio signals without interaction with any intermediary devices between the communicating devices. Furthermore, a device can communicate information using radio signals, e.g. a user identifier, to another device without the devices engaging in a pairing process that requires user input and without requiring explicit user authorization to communicate with another device. The direct radio signal communication functionality can be performed by any appropriate computing device, e.g. wristwatch, a mobile phone, a portable music player, a tablet computer, a laptop computer, a personal digital assistant, a smartphone, a keychain beacon, or another handheld or wearable mobile device to name a few examples. The radio signals emitted by the devices for such wireless communication can be part of any appropriate standard for mid-range to short-range radio communications having an operable range of at least 1 meter and up to about 50 meters, e.g., Bluetooth, Bluetooth 4.0, and BLE. Other techniques, such as geo-fencing or sensors using global positioning system (GPS), may also be used for location determination. The radio signals described in this specification can be any appropriate type of signal, e.g., a broadcast or advertiser signal that indicates presence of the device to nearby devices, or a connection signal that transmits data to a connected nearby device, to name a few examples. In this specification, a device can be said to be "nearby," "neighboring" or "proximate" if the device is within the operable range for performing direct radio signal communication with another user device.

The term "logging in" or "checking in" may thus refer to the customer's action through a user application to indicate availability to conduct a payment transaction or to communication by the user device of such an indication to the beacon or to the POS terminal, as the context requires. In essence, checking in constitutes a consent by the user to conduct a card-less transaction with the merchant. This consent differs from actual authorization of the transaction, which the user would provide, e.g., verbally, upon learning the amount of the transaction.

The term 'parsing' refers to analyzing a message between components, devices or engines. Messages sent between discrete components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components. The grammar syntax itself may be presented as structured data that is interpreted and/or otherwise used to generate the parsing mechanism. Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

The term "cause" and variations thereof, as used throughout this description, refers to either direct causation or indirect causation. For example, a computer system can "cause" an action by sending a message to a second computer system that commands, requests or prompts the second computer system to perform the action. Any number of intermediary devices may examine and/or relay the message during this process. In this regard, a device can "cause" an action even though it may not be known to the device whether the action will ultimately be executed or completed.

The term "component" or "engine" refers broadly to general or specific-purpose hardware, software, or firmware (or any combination thereof) components. Modules and engines are typically functional components that can generate useful data or other output using specified input(s). A module or engine may or may not be self-contained. Depending upon implementation-specific or other considerations, the modules or engines may be centralized or functionally distributed. An application program (also called an "application") may include one or more components and/or engines, or a component and/or engine can include one or more application programs.

What is claimed is:

1. A computer-implemented method for processing, by a payment processing system, a fund transfer request between a merchant associated with a payment beacon device and a customer associated with a customer device, the fund transfer request initiated while the payment beacon device and the customer device are both offline with respect to the payment processing system, the method comprising:

generating, by the payment beacon device, a merchant payment proxy associated with the merchant, the merchant payment proxy comprising banking information associated with the merchant and a syntax of a monetary currency indicator preceding an alphanumeric character;

establishing, when at least one of the customer device or the payment beacon device is offline with respect to the payment processing system, a communication channel between the customer device and the payment beacon device based on a short-range communication network protocol;

transmitting, by a transmitter component of the payment beacon device via the communication channel, and while the payment beacon device is offline with respect to the payment processing system, the fund transfer request having (i) the merchant payment proxy associated with the merchant, and (ii) a money transfer amount corresponding to a payment transaction between the customer and the merchant;

obtaining, by a receiver component of the customer device via the communication channel and while the customer device is offline with respect to the payment processing system, the fund transfer request transmitted by the payment beacon device, the fund transfer request stored locally on the customer device;

transitioning, by the customer device, into an online-mode by establishing a long-range communication channel with the payment processing system;

automatically sending, by the customer device after the customer device transitions into the online-mode, the fund transfer request to the payment processing system;

parsing, via the payment processing system, the merchant payment proxy in the fund transfer request to identify the merchant associated with the merchant payment proxy, the parsing based on a stored association between the merchant payment proxy and the merchant, the stored association established in a registration of the merchant payment proxy with the payment processing system;

identifying, by the payment processing system, a merchant financial account associated with the identified merchant, based on a stored relationship between the merchant financial account and the identified merchant, the stored relationship established in a registration of the merchant financial account with the payment processing system; and initiating, by the payment processing system, a transfer of the money transfer amount from a financial account of the customer to the merchant financial account.

2. The computer-implemented method of claim 1, further comprising:

obtaining, by the payment processing system and from the transmitter component of the payment beacon device after the payment beacon device establishes the long-range communication channel with the payment processing system, another fund transfer request having (a) a customer payment proxy associated with the customer, and (b) the money transfer amount, wherein the other fund transfer request is generated in response to the same payment transaction;

arranging, by the payment processing system, the fund transfer request and the other fund transfer request in a chronological order; and processing, by the payment processing system, one of the fund transfer request and the other fund transfer request based at least in part on the chronological order.

3. The computer-implemented method of claim 1, further comprising:

accessing, through a risk analysis component of the customer device, a risk score associated with the payment beacon device; and provisionally completing, through a payment processing component of the customer device and while the customer device is offline with respect to the payment processing system, the fund transfer request based at least on the risk score, wherein the completion includes an authorization or a rejection of the transfer of the money transfer amount.

4. The computer-implemented method of claim 1, wherein the short-range communication network protocol is selected from a group of: a Bluetooth communication protocol, a Bluetooth Low Energy communication protocol, a radio frequency based communication protocol, and a mesh-networking based protocol.

5. A computer-implemented method to process a transfer of funds between a customer associated with a first computing device and a merchant associated with a second computing device through a payment processing system, the method comprising:
   generating a payment proxy, the payment proxy comprising banking information associated with at least one of the customer or the merchant;
   establishing, through a transceiver component of the first computing device associated with the customer and while the first computing device is offline with respect to the payment processing system, a short-range communication channel with the second computing device associated with the merchant;
   obtaining, through the transceiver component of the first computing device and while the first computing device is offline with respect to the payment processing system, a fund transfer request from the second computing device, wherein the fund transfer request includes at least one payment proxy corresponding to the merchant, the at least one payment proxy having a syntax of a monetary currency indicator preceding an alphanumeric character; and
   sending, by the first computing device, after the first computing device transitions into an online-mode by establishing a long-range communication channel with the payment processing system:
      the fund transfer request from the first computing device to the payment processing system to facilitate the transfer of funds between a financial account of the customer and a financial account of the merchant, wherein the financial account of the merchant is derived from the at least one payment proxy in the fund transfer request; and
      a notification to the second computing device indicating a submission of the fund transfer request to the payment processing system.

6. The computer-implemented method of claim 5 further comprising:
   sending, by the first customer device, through the transceiver component and while the first computing device is offline with respect to the payment processing system, another fund transfer request to the second computing device, wherein the other fund transfer request includes at least one payment proxy corresponding to the customer, wherein the other fund transfer request is generated in response to a payment transaction for which the fund transfer request was generated; and
   causing the other fund transfer request to be sent to the payment processing system through the second computing device after the second computing device establishes a long-range communication channel with the payment processing system.

7. The computer-implemented method of claim 6 further comprising receiving, from the payment processing system, another notification indicating whether the fund transfer request or the other fund transfer request is authorized.

8. The computer-implemented method of claim 5 further comprising:
   accessing, through a risk analysis component, a risk score associated with the second computing device; and
   provisionally completing, through a payment processing component of the first computing device and while the first computing device is offline with respect to the payment processing system, the fund transfer request based at least on the risk score, wherein the completion includes an authorization or a rejection of the transfer of funds.

9. The computer-implemented method of claim 8, further comprising updating the risk score after the transfer of funds between the customer and the merchant.

10. The computer-implemented method of claim 5 further comprising receiving, via the payment processing system and on a user interface of the first computing device, a confirmation link to confirm the transfer of funds between the financial account of the customer and the financial account of the merchant, wherein the transfer of funds is triggered in response to the fund transfer request.

11. The computer-implemented method of claim 5, wherein the short-range communication channel is based on a protocol selected from a group of a Bluetooth communication protocol, a Bluetooth Low Energy communication protocol, a radio frequency based communication protocol, and a mesh-networking based protocol.

12. The computer-implemented method of claim 5, wherein the long-range communication channel is based on a protocol selected from a group of a wide area network protocol, a personal area network (PAN) protocol, a local area network (LAN) protocol, a campus area network (CAN) protocol, a cloud network protocol, and a metropolitan area network (MAN) protocol.

13. The computer-implemented method of claim 5, wherein detecting includes:
   determining, by a location component within the first computing device, an identifier associated with the second computing device, wherein the identifier is at least one of a name of the second computing device, a received signal strength indicator value in relation to the second computing device, a physical identifier associated with the second computing device, or geographical coordinates of the second computing device;
   based on the identifier, selecting the second computing device from amongst a plurality of neighboring devices available within a communication distance range of the first computing device, wherein the communication distance range is subject to a short-range communication protocol; and
   establishing, through one or more network interfaces of the first computing device and based on the short-range communication protocol, the short-range communication channel with a respective network interface of the second computing device.

14. The computer-implemented method of claim 5, wherein the fund transfer request includes a transaction summary in response to a payment transaction between the merchant and the customer for at least one item, and wherein the transaction summary includes at least one of: information related to a description of the item purchased; the price of the item; or funds owed to the merchant.

15. The computer-implemented method of claim 6 further comprising:
   using a contention component of the first computing device, selecting between the first computing device and the second computing device if both the first computing device and the second computing device transition into the online-mode substantially contemporaneously; and in the online-mode, sending, via the selected computing device, one of the fund transfer request and the other fund transfer request to the payment processing system, wherein the sending operation initiates the transfer of funds between the customer and the merchant.

16. The computer-implemented method of claim 5 further comprising registering the payment proxy with the payment processing system by associating the payment proxy of the customer with a financial account of the customer.

17. The computer-implemented method of claim 5 further comprising generating, through a mobile payment application accessed through the first computing device and while the first computing device is online with respect to the payment processing system, a message for the payment processing system by specifying the payment proxy and the money transfer amount in the message.

18. A system comprising:
one or more processors;
memory;
one or more computer-executable instructions stored in the memory and executable by the one or more processors to:
process, by a payment processing system, a fund transfer request between a merchant associated with a payment beacon device and a customer associated with a customer device, the fund transfer request initiated while the payment beacon device and the customer device are both offline with respect to the payment processing system;
generate, by the payment beacon device, a merchant payment proxy associated with the merchant, the merchant payment proxy comprising banking information associated with the merchant and a syntax of a monetary currency indicator preceding an alphanumeric character;
establish, when at least one of the customer device or the payment beacon device is offline with respect to the payment processing system, a communication channel between the customer device and the payment beacon device based on a short-range communication network protocol;
transmit, by a transmitter component of the payment beacon device via the short-range communication channel, and while the payment beacon device is offline with respect to the payment processing system, the fund transfer request having (i) the merchant payment proxy associated with the merchant, and (ii) a money transfer amount corresponding to a payment transaction between the customer and the merchant;
obtain, by a receiver component of the customer device and while the customer device is offline with respect to the payment processing system, the fund transfer request transmitted by the payment beacon device, the fund transfer request stored locally on the customer device;
transition, by the customer device, into an online-mode by establishing a long-range communication channel with the payment processing system;
automatically send, by the customer device after the customer device transitions into the online-mode, the fund transfer request to the payment processing system;
parse, via the payment processing system, the merchant payment proxy in the fund transfer request to identify the merchant associated with the merchant payment proxy, the parsing based on a stored association between the merchant payment proxy and the merchant, the stored association established in a registration of the merchant payment proxy with the payment processing system;
identify, by the payment processing system, a merchant financial account associated with the identified merchant, based on a stored relationship between the merchant financial account and the identified merchant, the stored relationship established in a registration of the merchant financial account with the payment processing system; and
initiate, by the payment processing system, a transfer of the money transfer amount from a financial account of the customer to the merchant financial account.

19. The system of claim 18, the one or more computer-executable instructions further executable to:
obtain, by the payment processing system and from the transmitter component of the payment beacon device after the payment beacon device establishes a long-range communication channel with the payment processing system, another fund transfer request having (a) a customer payment proxy associated with the customer, and (b) the money transfer amount, wherein the other fund transfer request is generated in response to the same payment transaction;
arrange, by the payment processing system, the fund transfer request and the other fund transfer request in a chronological order; and
process, by the payment processing system, one of the fund transfer request and the other fund transfer request based at least in part on the chronological order.

20. The system of claim 18, the one or more computer-executable instructions further executable to:
access, through a risk analysis component of the customer device, a risk score associated with the payment beacon device; and
provisionally complete, through a payment processing component of the customer device and while the customer device is offline with respect to the payment processing system, the fund transfer request based at least on the risk score, wherein the completion includes an authorization or rejection of the transfer of the money transfer amount.

21. The system of claim 18, wherein the short-range communication network protocol is selected from a group of: a Bluetooth communication protocol, a Bluetooth Low Energy communication protocol, a radio frequency based communication protocol, and a mesh-networking based protocol.

22. One or more computing devices comprising:
one or more processors;
memory, coupled to the one or more processors and storing computer-executable instructions that, when executed on the one or more processors, cause the one or more processors to perform acts comprising:
establishing, through a transceiver component of a first computing device of the one or more computing devices, the first computing device associated with a customer, and while the first computing device is offline with respect to a payment processing system, a short-range communication channel with a second computing device associated with a merchant;
obtaining, through the transceiver component via the short-range communication channel and while the first computing device is offline with respect to the payment processing system, a fund transfer request from the second computing device, wherein the fund transfer request includes at least one payment proxy corresponding to the merchant, the at least one payment proxy having a syntax of a monetary currency indicator preceding an alphanumeric character; and transitioning, by the first computing device, to an online-mode by establishing a long-range communication channel with the payment processing system;

sending, by the first computing device, the fund transfer request to the payment processing system to facilitate the transfer of funds between a financial account of the customer and a financial account of the merchant, wherein the financial account of the merchant is derived from the at least one payment proxy in the fund transfer request; and sending, by the first computing device, a notification to the second computing device indicating a submission of the fund transfer request to the payment processing system.

23. The one or more computing devices of claim 22, the acts further comprising:

sending, through the transceiver component and while the first computing device is offline with respect to the payment processing system, another fund transfer request to the second computing device, wherein the other fund transfer request includes at least one payment proxy corresponding to the customer, wherein the other fund transfer request is generated in response to a payment transaction for which the fund transfer request was generated; and causing the other fund transfer request to be sent to the payment processing system through the second computing device after the second computing device establishes a long-range communication channel with the payment processing system.

24. The one or more computing devices of claim 23, the acts further comprising receiving, from the payment processing system, another notification indicating whether the fund transfer request or the other fund transfer request is authorized.

25. The one or more computing devices of claim 24, the acts further comprising:

using a contention component of the first computing device, selecting between the first computing device and the second computing device if both the first computing device and the second computing device transition into the online-mode substantially contemporaneously; and in the online-mode, sending, via the selected computing device, one of the fund transfer request and the other fund transfer request to the payment processing system, wherein the sending operation initiates the transfer of funds between the customer and the merchant.

26. The one or more computing devices of claim 22, the acts further comprising receiving, via the payment processing system and on a user interface of the first computing device, a confirmation link to confirm the transfer of funds between the financial account of the customer and the financial account of the merchant, wherein the transfer is triggered in response to the fund transfer request.

27. The one or more computing devices of claim 22, wherein the short-range communication channel is based on a protocol selected from a group of a Bluetooth communication protocol, a Bluetooth Low Energy communication protocol, a radio frequency based communication protocol, and a mesh-networking based protocol.

28. The one or more computing devices of claim 22, wherein the long-range communication channel is based on a protocol selected from a group of a wide area network protocol, a personal area network (PAN) protocol, a local area network (LAN) protocol, a campus area network (CAN) protocol, a cloud network protocol, and a metropolitan area network (MAN) protocol.

29. The one or more computing devices of claim 22, wherein detecting includes:

determining, by a location component within the first computing device, an identifier associated with the second computing device, wherein the identifier is at least one of a name of the second computing device, a received signal strength indicator value in relation to the second computing device, a physical identifier associated with the second computing device, or geographical coordinates of the second computing device;

based on the identifier, selecting the second computing device from amongst a plurality of neighboring devices available within a communication distance range of the first computing device, wherein the communication distance range is subject to a short-range communication protocol; and establishing, through one or more network interfaces of the first computing device and based on the short-range communication protocol, the short-range communication channel with a respective network interface of the second computing device.

30. The one or more computing devices of claim 22, wherein the fund transfer request includes a transaction summary in response to a payment transaction between the merchant and the customer for at least one item, and wherein the transaction summary includes at least one of: information related to a description of the item purchased; the price of the item; and funds owed to the merchant.

\* \* \* \* \*